United States Patent
Kimura et al.

(10) Patent No.: US 10,184,375 B2
(45) Date of Patent: Jan. 22, 2019

(54) ENGINE DEVICE

(71) Applicant: YANMAR CO., LTD., Osaka-shi, Osaka (JP)

(72) Inventors: Tomoyuki Kimura, Osaka (JP); Yoshiyuki Sandou, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 33 days.

(21) Appl. No.: 15/270,358

(22) Filed: Sep. 20, 2016

(65) Prior Publication Data

US 2017/0009628 A1    Jan. 12, 2017

Related U.S. Application Data

(63) Continuation of application No. PCT/JP2015/056961, filed on Mar. 10, 2015.

(30) Foreign Application Priority Data

| Mar. 20, 2014 | (JP) | 2014-059115 |
| Mar. 20, 2014 | (JP) | 2014-059116 |
| Mar. 27, 2014 | (JP) | 2014-065696 |

(51) Int. Cl.

| *F01N 3/00* | (2006.01) |
| *F01N 3/20* | (2006.01) |
| *B60K 13/04* | (2006.01) |
| *E02F 9/08* | (2006.01) |
| *F01N 13/18* | (2010.01) |
| *F01N 13/00* | (2010.01) |

(Continued)

(52) U.S. Cl.
CPC ............ *F01N 3/2066* (2013.01); *B60K 13/04* (2013.01); *E02F 9/0866* (2013.01); *F01N 3/021* (2013.01);

(Continued)

(58) Field of Classification Search
CPC .... B60K 11/04; B60K 13/04; B60Y 2200/22; B60Y 2200/221; B60Y 2200/41; B60Y 2200/412; E02F 9/0866; F01N 13/009; F01N 13/1855; F01N 2250/02; F01N 2450/24; F01N 2590/08; F01N 2610/02; F01N 2610/14; F01N 3/021; F01N 3/2066; Y02T 10/24

See application file for complete search history.

(56) References Cited

U.S. PATENT DOCUMENTS

| 8,695,748 B2 * | 4/2014 | Togo ........................ B60K 5/00 |
| | | 180/309 |
| 2010/0186388 A1 | 7/2010 | Olsen et al. |

(Continued)

FOREIGN PATENT DOCUMENTS

| JP | 2009-074420 A | 4/2009 |
| JP | 2010-229856 A | 10/2010 |

(Continued)

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

The engine device has a first case which removes particulate matters in exhaust gas of the engine, and a second case which removes nitrogen oxides in the exhaust gas of the engine. The second case is connected to the first case via a urea mixing pipe. The engine device is provided with a plurality of support leg bodies which are connected their one end sides to the engine, and a support base which is connected to a plurality of support leg bodies. The first case and the second case are arranged in the support base.

13 Claims, 30 Drawing Sheets

(51) Int. Cl.
*F01N 3/021* (2006.01)
*B60K 11/04* (2006.01)

(52) U.S. Cl.
CPC ....... *F01N 13/009* (2014.06); *F01N 13/1805* (2013.01); *F01N 13/1855* (2013.01); *B60K 11/04* (2013.01); *B60Y 2200/22* (2013.01); *B60Y 2200/221* (2013.01); *B60Y 2200/41* (2013.01); *B60Y 2200/412* (2013.01); *F01N 2250/02* (2013.01); *F01N 2450/24* (2013.01); *F01N 2590/08* (2013.01); *F01N 2610/02* (2013.01); *F01N 2610/14* (2013.01); *Y02T 10/24* (2013.01)

(56) References Cited

U.S. PATENT DOCUMENTS

| | | | |
|---|---|---|---|
| 2010/0186394 A1* | 7/2010 | Harrison | F01N 3/103 60/299 |
| 2010/0196219 A1 | 8/2010 | Endo et al. | |
| 2012/0017574 A1 | 1/2012 | Hasan et al. | |
| 2012/0273648 A1 | 11/2012 | Maske et al. | |
| 2013/0305688 A1 | 11/2013 | Kosaka | |
| 2013/0343853 A1 | 12/2013 | Sato et al. | |
| 2015/0211209 A1* | 7/2015 | Okuda | B60K 13/04 180/309 |

FOREIGN PATENT DOCUMENTS

| | | |
|---|---|---|
| JP | 2011-163339 A | 8/2011 |
| JP | 2012-021505 A | 2/2012 |
| JP | 2012-154302 A | 8/2012 |
| JP | 2012-177233 A | 9/2012 |
| JP | 2012-215022 A | 11/2012 |
| JP | 2013-001132 A | 1/2013 |
| JP | 2013-104394 A | 5/2013 |
| JP | 2013-116692 A | 6/2013 |
| JP | 2013-155706 A | 8/2013 |
| JP | 2013-189894 A | 9/2013 |
| JP | 5363681 B1 | 12/2013 |

* cited by examiner

ENGINE DEVICE

CROSS-REFERENCE TO RELATED APPLICATIONS

The present application is a continuation application of International Application No. PCT/JP2015/56961, filed Mar. 10, 2015, which claims priority to Japanese Patent Application No. 2014-59115, filed Mar. 20, 2014, Japanese Patent Application No. 2014-59116, filed Mar. 20, 2014, and Japanese Patent Application No. 2014-65696, filed Mar. 27, 2014. The contents of these applications are incorporated herein by reference in their entirety.

BACKGROUND OF THE INVENTION

The present invention relates to an engine device.

In a working vehicle such as the tractor or the wheel loader, an opening and closing fulcrum shaft was arranged in a rear portion of a hood for covering an engine and the hood was rotated around the opening and closing fulcrum shaft, for streamlining a maintenance work of the engine which was arranged in a front portion of a travel machine body. Further, there has been conventionally known a technique of purifying the exhaust gas discharged from the diesel engine by arranging a case inwardly provided with a soot filter (a diesel particulate filter) (hereinafter, refer to as a DPF case) and a case inwardly provided with a urea selective reducing type SCR catalyst (hereinafter, refer to as an SCR case) as an exhaust gas purification device (an exhaust gas aftertreatment device) in an exhaust channel of the diesel engine, and introducing the exhaust gas to the DPF case and the SCR case (for example, refer to Japanese Unexamined Patent Publication No. 2009-74420, Japanese Unexamined Patent Publication No. 2012-21505, Japanese Unexamined Patent Publication No. 2013-104394, and Japanese Unexamined Patent Publication No. 2012-177233).

SUMMARY OF THE INVENTION

According to Japanese Unexamined Patent Publication No. 2009-74420, Japanese Unexamined Patent Publication No. 2012-21505, and Japanese Unexamined Patent Publication No. 2013-104394, in the case that the DPF case and the SCR case are assembled away from the engine, the temperature of the exhaust gas supplied from the engine to the DPF case or the SCR case has been conventionally lowered, and a chemical reaction such as regeneration of a diesel particulate filter or a selective catalyst reducing action has tended to be incomplete. Accordingly, there has been conventionally a problem that, for example, a special device for keeping the temperature of the exhaust gas in the SCR case at a high temperature is necessary. Further, there is a technique of attaching the DPF case and the SCR case by attaching the DPF case and the SCR case to two parallel base frames, and fastening these two base frames to a subject to be installed, such as Japanese Unexamined Patent Publication No. 2013-104394. However, it is necessary to form an attaching surface of the subject to be installed into a horizontal shape (a flat shape), and there is a problem that, for example, a support attitude of the DPF case and the SCR case is hard to be set to a predetermined attitude due to a working error of the attachment part such as the base frame. On the other hand, in the case that the DPF case and the SCR case are assembled close to the engine, it is necessary to secure an installation space for the SCR case in a lateral side of the engine. As a result, there is a problem that, for example, the DPF case and the SCR case can not be supported compactly as well as an engine room is hard to be constructed compactly.

On the other hand, according to Japanese Unexamined Patent Publication No. 2012-177233, in the case that the DPF case and the SCR case are assembled close to the engine, the temperature of the exhaust gas in the SCR case can be easily maintained at a high temperature by reducing the temperature reduction of the exhaust gas which is supplied to the SCR case from the engine, however, it is necessary to secure an installation space for the SCR case in a lateral side of the engine. As a result, there is a problem, for example, that the DPF case, the SCR case, or the like can not be supported compactly as well as an engine room is hard to be constructed compact. Further, there is a problem, for example, that an assembly workability, a maintenance workability, or the like of the DPF case, the SCR case, or the like can not be improved, in the engine room which is restricted its magnitude.

Consequently, the invention aims at providing an engine device to which an improvement is applied by making a study of these actual conditions.

The invention according to a first aspect of the present invention is an engine device including a first case which removes particulate matters in exhaust gas of an engine, a second case which removes nitrogen oxides in the exhaust gas of the engine, and the second case being connected to the first case via a urea mixing pipe, wherein the engine device includes a plurality of support leg bodies which are connected their one end sides to the engine and a support base which is connected to the plurality of support leg bodies, and the first case and the second case are arranged in the support base.

The invention according to a second aspect of the present invention is the engine device according to the first aspect, wherein a support frame body may be provided for firmly fixing the first case and the second case, the support base may be firmly and approximately horizontally fixed to an upper surface side of the engine via the plurality of support leg bodies, the support frame body may be firmly fixed to an upper surface side of the support base, the first case and the second case may be arranged in the upper surface side of the support base via the support frame body in a sideways falling attitude, and the urea mixing pipe may be arranged between the first case and the second case in their upper face sides.

The invention according to a third aspect of the present invention is the engine device according to the first aspect, wherein a vent hole may be formed in the support base in a lower surface side of the first case or the second case, and an air passage may be formed between the engine and each of the cases by portions between the plurality of support leg bodies and the vent hole.

The invention according to a fourth aspect of the present invention is the engine device according to the second aspect, wherein an exhaust gas purification unit may be formed by firmly and integrally fixing the first case and the second case by the support frame body, and the exhaust gas purification unit may be detachably supported to the support base.

The invention according to a fifth aspect of the present invention is the engine device according to the first aspect, wherein an exhaust gas purification unit may be formed by firmly and integrally fixing the first case and the second case by the support frame body, and an exhaust gas outlet pipe may be used as a support member for the exhaust gas purification unit by connecting an exhaust gas inlet pipe of the first case to the exhaust gas outlet pipe of the engine.

The invention according to a sixth aspect of the present invention is the engine device according to the fifth aspect, wherein the plurality of support leg bodies may be connected their upper end sides to a lower surface side of the support base having a rectangular shape in a plan view, the support base may be arranged in an upper surface side of the engine via the plurality of support leg bodies, and the support frame body may be firmly and detachably fixed to an approximately horizontal upper surface side of the support base.

The invention according to a seventh aspect of the present invention is the engine device according to the sixth aspect, wherein the plurality of support leg bodies may be respectively connected their lower end sides to three directions including a left side surface and a right side surface of a front portion of a cylinder head having the rectangular shape in the plan view of the engine, and a back surface of a rear portion of the cylinder head.

The invention according to an eighth aspect of the present invention is the engine device according to the sixth aspect, wherein a part of the support base may be extended to an upper surface side of the exhaust gas outlet pipe of the engine with which the exhaust gas inlet pipe of the first case comes into contact, a part of the support base may be brought into contact with an upper surface side of the exhaust gas outlet pipe of the engine from above thereof, and the support base may be fastened to the exhaust gas outlet pipe.

The invention according to a ninth aspect of the present invention is the engine device according to the first aspect, wherein a side surface of the support base may be fastened to any one of support leg body side surfaces of the plurality of support leg bodies by being brought into contact therewith, and a lower surface of the support base may be fastened to any other support leg body upper surfaces of the plurality of support leg bodies by being brought into contact therewith.

The invention according to a tenth aspect of the present invention is the engine device according to the ninth aspect, wherein the support base may be provided in an upper surface side of the engine via at least three support leg bodies, a side wall inner surface of the support base may be fastened to side surfaces of at least two support leg bodies by being brought into contact therewith, an upper surface of at least one support leg body may be fastened to a top wall lower surface of the support base by being brought into contact therewith, and the support leg body side surface brought into contact with the top wall lower surface of the support base and a side wall of the support base may be spaced therebetween.

The invention according to an eleventh aspect of the present invention is the engine device according to the tenth aspect, wherein a fastening bolt may be threadably attached to at least one support leg body and the support base from an upper surface direction, and a fastening bolt may be threadably attached to at least two support leg bodies and the support base from a side surface direction.

The invention according to a twelfth aspect of the present invention is the engine device according to the tenth aspect, wherein the support base may be firmly fixed to an exhaust gas outlet pipe from an upper surface direction via bolts which are implanted to an upper surface side of the exhaust gas outlet pipe of the engine.

According to the embodiment of the invention of the first aspect, in the engine device including the first case which removes the particulate matters in the exhaust gas of the engine, the second case which removes the nitrogen oxides in the exhaust gas of the engine, and the second case being connected to the first case via the urea mixing pipe, the engine device includes a plurality of support leg bodies which are connected their one end sides to the engine, and the support base which is connected to the plurality of support leg bodies, and the first case and the second case are arranged in the support base. As a result, the support structure for the first case 28 and the second case 29 can be constructed by being separated into the support portion (the support base) for the first case and the second case, and the support post portions (a plurality of support leg bodies) supporting the support portion (the support base), a cooling air passage can be secured between the plurality of support leg bodies, it is possible to reduce interference between an attached part of the engine and the first case or the second case while it is possible to well maintain a ventilation performance in an outer peripheral portion of the engine, it is possible to improve an assembly workability of the engine, and it is possible to improve a maintenance workability of the engine.

According to the embodiment of the invention of the second aspect, the support frame body is provided for firmly fixing the first case and the second case, the support base is firmly and approximately horizontally fixed to the upper surface side of the engine via the plurality of support leg bodies, the support frame body is firmly fixed to the upper surface side of the support base, the first case and the second case are arranged in the upper surface side of the support base via the support frame body in the sideways falling attitude, and the urea mixing pipe is arranged between the first case and the second case in their upper surface sides. As a result, the first case and the second case can be integrally assembled and disassembled by connecting and disconnecting the support base and the support frame body, and the first case and the second case can be compactly supported at a low level to the upper surface side of the engine. Further, it is possible to maintain an attachment interval between the first case and the second case constant via the support frame body with a simple assembling work, and it is possible to simplify an exhaust gas piping structure of the urea mixing pipe and the like between the cases.

According to the embodiment of the invention of the third aspect, the vent hole is formed in the support base in the lower surface side of the first case or the second case, and the air passage is formed between the engine and each of the cases by the portions between the plurality of support leg bodies and the vent hole. As a result, it is possible to easily suppress temperature rise in the engine outer peripheral portion facing to the first case or the second case, and it is possible to improve durability of the attached part in the engine upper surface side.

According to the embodiment of the invention of the fourth aspect, the exhaust gas purification unit is formed by firmly and integrally fixing the first case and the second case by the support frame body, and the exhaust gas purification unit is detachably supported to the support base. Each of the cases can be easily assembled in the engine by an assembly process near an end of the assembly process of the engine, and it is possible to easily detach the exhaust gas purification unit body from the engine with a maintenance work or a repair work of the engine. Further, the engine and the exhaust gas purification unit can be packed by a transport pallet in a separated state and can be effectively accommodated in an inner portion of a transport container, the engine and the exhaust gas purification unit can be efficiently packed in an internal space of the transport container, and it is possible to reduce a transport cost from an assembly place of the engine or the exhaust gas purification unit to a mounting place on the working vehicle.

According to the embodiment of the invention of the fifth aspect, the exhaust gas purification unit is formed by firmly and integrally fixing the first case and the second case by the support frame body, and the exhaust gas outlet pipe is used as the support member for the exhaust gas purification unit by connecting the exhaust gas inlet pipe of the first case to the exhaust gas outlet pipe of the engine. As a result, the exhaust gas purification unit can be supported by the exhaust gas outlet pipe having a high rigidity with the structure for attaching the exhaust gas purification unit to the outer peripheral side of the engine, it is possible to easily secure a support strength of the exhaust gas purification unit, and the exhaust gas purification unit can be easily attached to and detached from the engine in the maintenance work or the repair work of the engine.

According to the embodiment of the invention of the sixth aspect, a plurality of support leg bodies are connected their upper end sides to the lower surface side of the support base having the rectangular shape in the plan view, the support base is arranged in the upper surface side of the engine via the plurality of support leg bodies, and the support frame body is firmly and detachably fixed to the approximately horizontal upper surface side of the support base. As a result, the exhaust gas purification unit can be supported by the plurality of support leg bodies and the exhaust gas outlet pipe, and it is possible to easily simplify the support structure for a plurality of support leg bodies while it is possible to easily secure a support strength of the exhaust gas purification unit. Further, since the support base can be arranged at a position which is away from the outer peripheral surface of the engine via the support leg bodies, it is possible to reduce the interference with the attached part of the engine, and it is possible to improve the maintenance workability of the engine as well as the assembly workability of the engine.

According to the embodiment of the invention of the seventh aspect, the plurality of support leg bodies are respectively connected their lower end sides to three directions including the left side surface and the right side surface of the front portion of the cylinder head having the rectangular shape in the plan view of the engine, and the back surface of the rear portion of the cylinder head. As a result, the exhaust gas purification unit can be supported while using the outer peripheral portion of the cylinder head as the fixing portion, and the exhaust gas purification unit can be assembled in the engine while requiring almost no change of the engine main body side. Further, the engine can be easily moved to a storage place or an assembly place by suspending the engine with a chain block while using the support leg body as an engine lifting bracket attachment seat, in the engine assembling plant.

According to the embodiment of the invention of the eighth aspect, the part of the support base is extended to the upper surface side of the exhaust gas outlet pipe of the engine with which the exhaust gas inlet pipe of the first case comes into contact, the part of the support base is brought into contact with the upper surface side of the exhaust gas outlet pipe of the engine from above thereof, and the support base is fastened to the exhaust gas outlet pipe. As a result, the upper surface of the exhaust gas outlet pipe can be formed as an attachment standard for both of the exhaust gas purification unit and the support base. In other words, since it is possible to decide the attachment position (a height or a horizontal degree) of the exhaust gas purification unit or the support base by the upper surface of the exhaust gas outlet pipe, the exhaust gas purification unit can be fastened to the support base after the support base is fastened to the exhaust gas outlet pipe (the engine), in the engine assembling plant. In the case that the exhaust gas purification unit is installed in the engine, it is possible to easily dissolve a working dimensional error of the exhaust gas purification unit or the support base, and it is possible to improve the assembly workability of the exhaust gas purification unit.

According to the embodiment of the invention of the ninth aspect, the side surface of the support base is fastened to any one of support leg body side surfaces of the plurality of support leg bodies by being brought into contact therewith, and the lower surface of the support base is fastened to any other support leg body upper surfaces of the plurality of support leg bodies by being brought into contact therewith. As a result, it is possible to easily adjust the attachment position between the plurality of support leg bodies and the support base, even if a working error is generated in the fixing position of the support base to the plurality of support leg bodies. It is possible to easily execute a bolt fastening work by which the plurality of support leg bodies and the support base are connected, without correction of the shape of the plurality of support leg bodies or the support base, and it is possible to improve the attachment workability between the plurality of support leg bodies and the support base.

According to the embodiment of the invention of the tenth aspect, the support base is provided in the upper surface side of the engine via at least three support leg bodies, the side wall inner surface of the support base is fastened to the side surfaces of at least two support leg bodies by being brought into contact therewith, the upper surface of at least one support leg body is fastened to the top wall lower surface of the support base by being brought into contact therewith, and the support leg body side surface brought into contact with the top wall lower surface of the support base and the side wall of the support base are spaced therebetween. As a result, it is possible to easily absorb a fastening error (a working dimensional error) between at least two support leg body side surfaces and the support base side surface by fastening the upper surface of at least one support leg body and the lower surface of the support base. It is possible to save a working labor hour for correcting the working dimensional error of the support leg body or the support base, and it is possible to simplify the work for fastening the support leg bodies and the support base.

According to the embodiment of the invention of the eleventh aspect, the fastening bolt is threadably attached to at least one support leg body and the support base from the upper surface direction, and the fastening bolt is threadably attached to at least two support leg bodies and the support base from the side surface direction. As a result, it is possible to firmly fix the upper surface, any of the right and left side surfaces, and any of the front and rear side surfaces of the support base to at least three support leg bodies via the fastening bolts. In other words, since the support leg bodies and the support base can be fastened from the same number of attaching directions as the number of the plurality of support leg bodies, it is possible to easily absorb the working dimensional error of each of the support leg bodies or the support base, and it is possible to easily improve a connection rigidity between each of the support leg bodies and the support base. Further, it is possible to easily cover the rectangular upper surface side of the engine with the support base while the support base can be formed into the rectangular shape on which the first case and the second case are easily mounted. Further, the first case and the second case can be mounted to the upper surface side of the engine by making good use of the support base as the upper surface side cover for the engine.

According to the embodiment of the invention of the twelfth aspect, the support base is firmly fixed to the exhaust gas outlet pipe from the upper surface direction via the bolts which are implanted to the upper surface side of the exhaust gas outlet pipe of the engine. As a result, it is possible to connect the exhaust gas purification device such as the first case and the second case to the support base on the basis of the exhaust gas outlet pipe, it is possible to easily dissolve the assembly dimension error of the exhaust gas purification device such as the first case and the second case by the simple connection position adjustment of the support base, and it is possible to improve the assembly workability of the exhaust gas purification device such as the first case and the second case.

DESCRIPTION OF THE EMBODIMENTS

Figure 1:
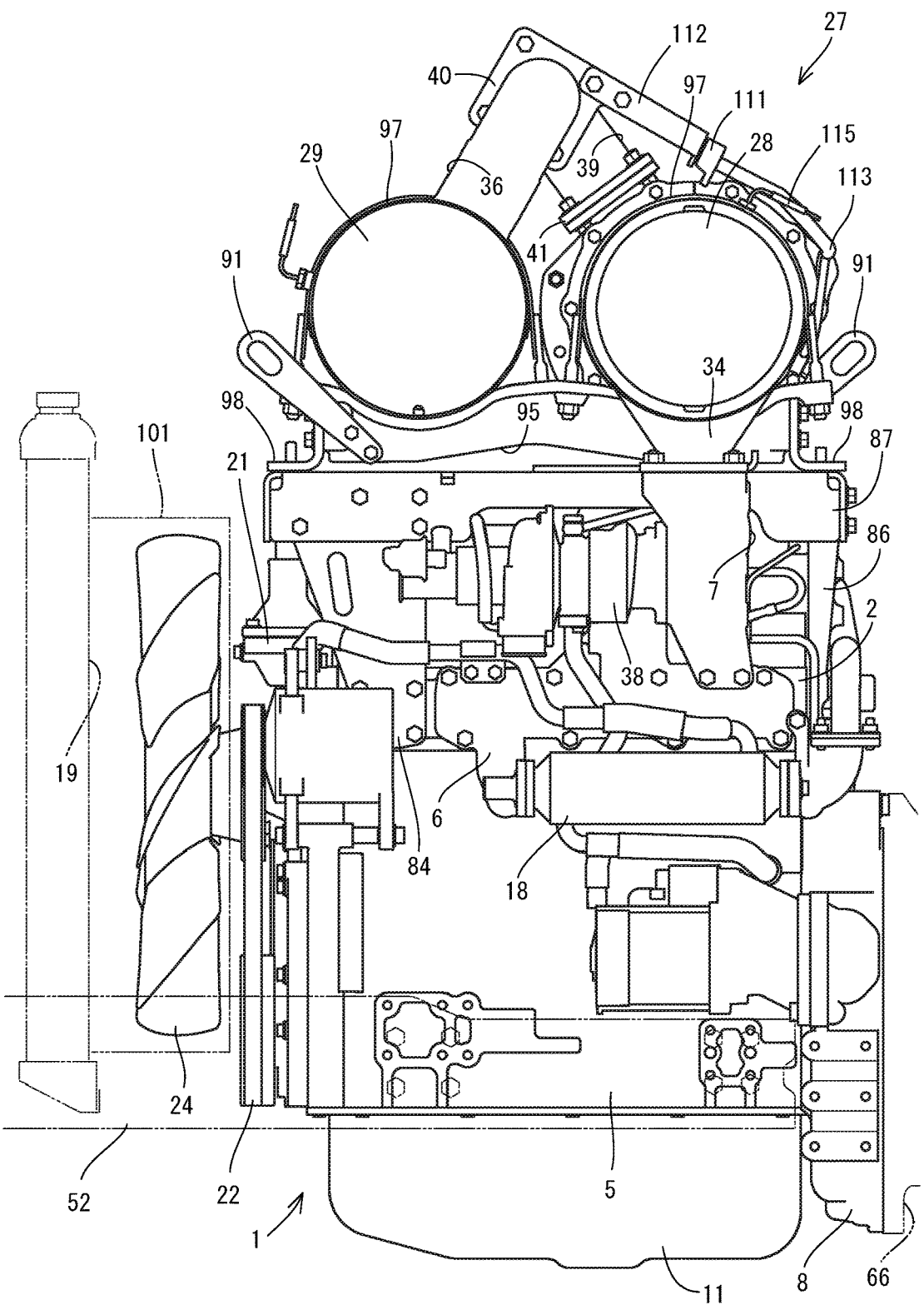
FIG. 1 is a left side elevational view of a diesel engine and shows a first embodiment.
Figure 2:
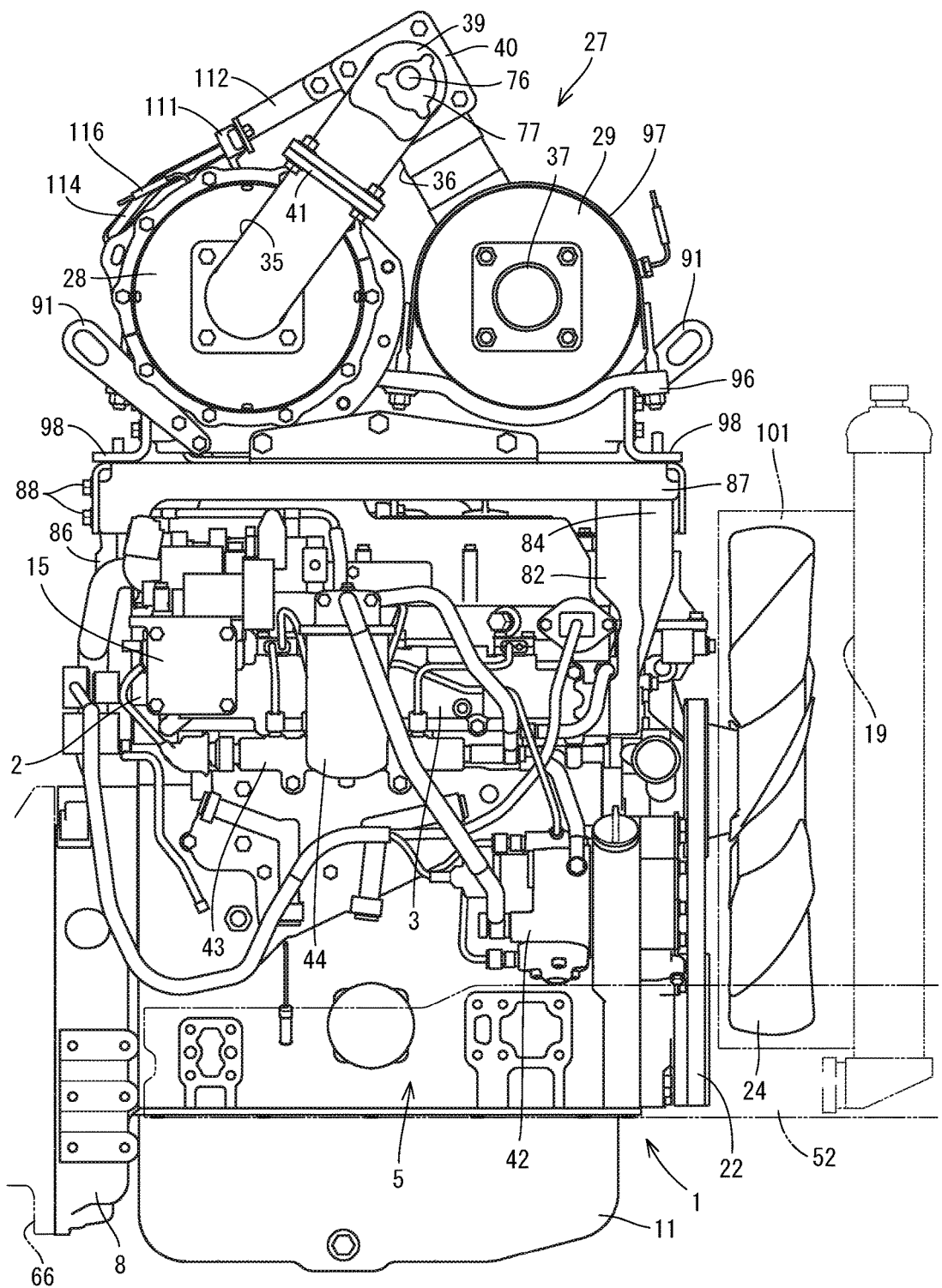
FIG. 2 is a right side elevational view of the same.
Figure 3:
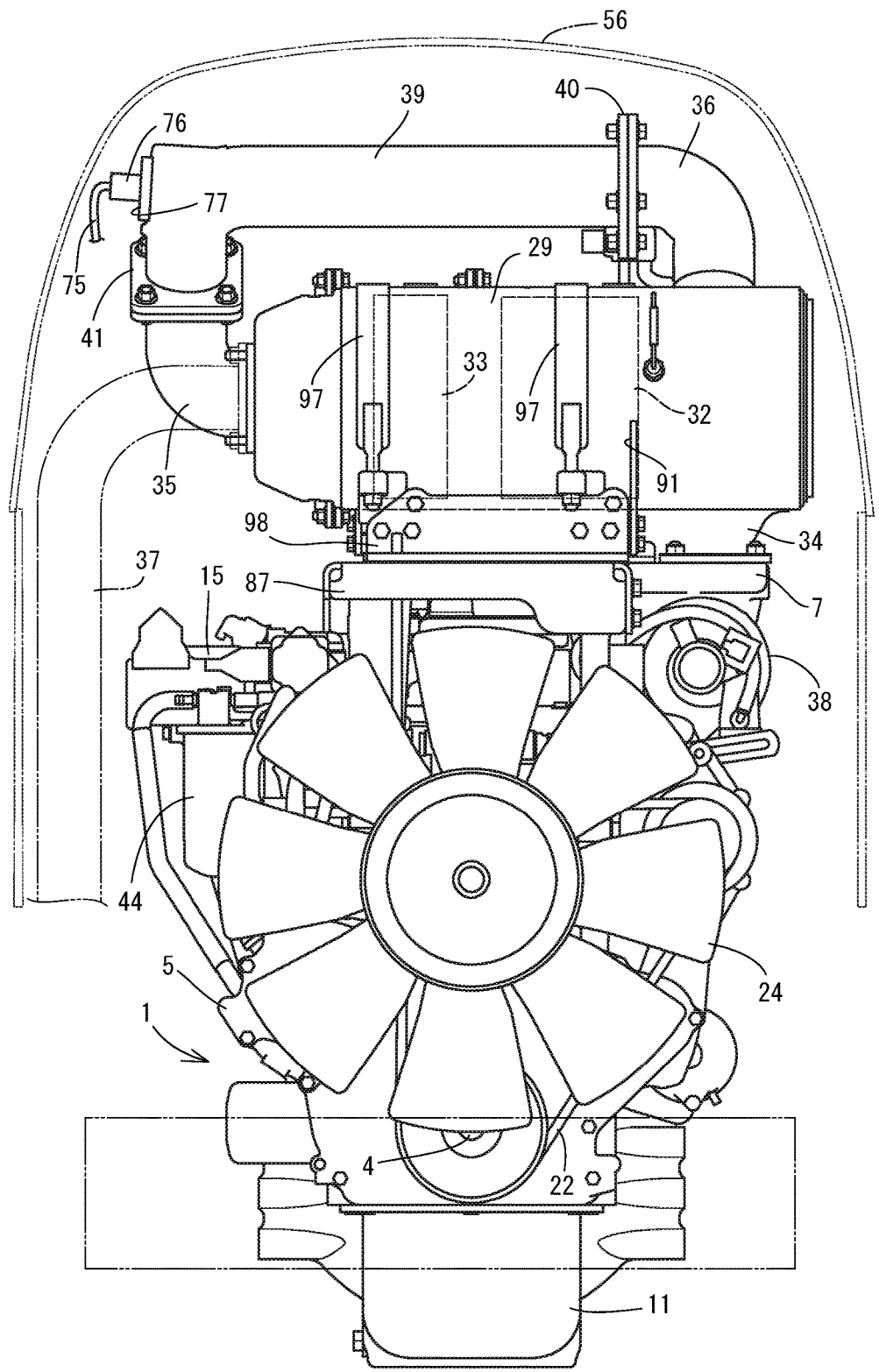
FIG. 3 is a front elevational view of the same.

A description will be given below of a first embodiment obtained by embodying the present invention with reference to the accompanying drawings (FIGS. 1 to 12). FIG. 1 is a left side elevational view of a diesel engine 1 in which an exhaust manifold 6 is installed, FIG. 2 is a right side elevational view of the diesel engine 1 in which an intake manifold 3 is installed, and FIG. 3 is a front elevational view of the diesel engine 1 in which a cooling fan 24 is installed. A side in which the exhaust manifold 6 is installed is called as a left side surface of the diesel engine 1, a side in which the intake manifold 3 is installed is called as a right side surface of the diesel engine 1, and a side in which the cooling fan 24 is installed is called as a front surface of the diesel engine 1. A description will be given of an overall structure of the diesel engine 1 with reference to FIGS. 1 to 8.

As shown in FIGS. 1 to 7, an intake manifold 3 is arranged in one side surface of a cylinder head 2 of a diesel engine 1. The cylinder head 2 is mounted on a cylinder block 5 which has an engine output shaft 4 (a crank shaft) and a piston (not shown) built-in. An exhaust manifold 6 is arranged in the other side surface of the cylinder head 2. A front end and a rear end of the engine output shaft 4 are protruded out of a front surface and a back surface of the cylinder block 5.

As shown in FIGS. 1 to 7, a flywheel housing 8 is firmly fixed to the back surface of the cylinder block 5. A flywheel 9 is provided within the flywheel housing 8. The flywheel 9 is axially supported to the rear end side of the engine output shaft 4. Power of the diesel engine 1 is adapted to be taken out via the flywheel 9. Further, a sump 11 is arranged in a lower surface of the cylinder block 5.

As shown in FIGS. 2 to 5 and FIG. 7, an exhaust gas recirculation device (EGR) 15 taking into exhaust gas for recirculation is arranged in the intake manifold 3. An air cleaner 16 (refer to FIG. 13) is connected to the intake manifold 3. External air which is dust removed and purified by the air cleaner 16 is adapted to be fed to the intake manifold 3, and be supplied to each of cylinders of the diesel engine 1.

According to the above structure, the exhaust gas discharged out of the diesel engine 1 to the exhaust manifold 6 is partly reflowed to each of the cylinders of the diesel engine 1 from the intake manifold 3 via the exhaust gas recirculation device 15. As a result, a combustion temperature of the diesel engine 1 is lowered, a discharge amount of nitrogen oxides (NOx) from the diesel engine 1 is lowered, and a fuel consumption of the diesel engine 1 is improved.

Figure 13:
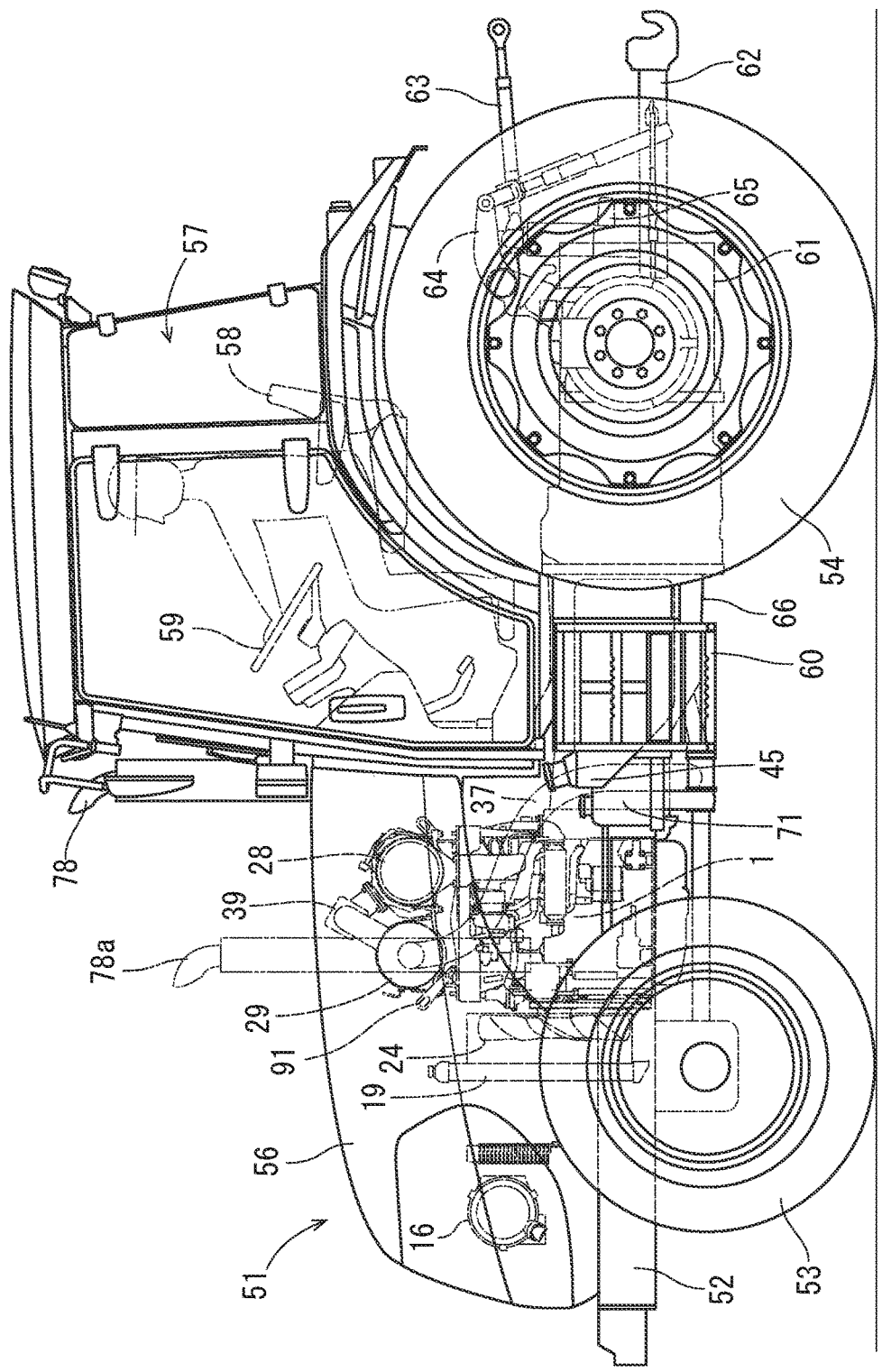
FIG. 13 is a left side elevational view of a tractor which mounts a diesel engine thereon.

A cooling water pump 21 is provided for circulating cooling water within the cylinder block 5 and in a radiator 19 (refer to FIG. 13). The cooling water pump 21 is arranged in a side where a cooling fan 24 is installed in the diesel engine 1. The cooling water pump 21 and the cooling fan 24 are coupled to the engine output shaft 4 via a V-belt 22 and the like, and the cooling water pump 21 and the cooling fan 24 are driven. The cooling water is fed into the cylinder block 5 from the cooling water pump 21 via an EGR cooler 18 of the exhaust gas recirculation device 15, and the diesel engine 1 is adapted to be cooled by a wind of the cooling fan 24.

As shown in FIGS. 1 to 8, as an exhaust gas purification device 27 (an exhausted gas purification unit) for purifying the exhaust gas discharged out of the cylinders of the diesel engine 1, there are provided a first case 28 serving as a diesel particulate filter (DPF) which removes particulate matters in the exhaust gas of the diesel engine 1, and a second case 29 serving as a urea selective catalyst reducing (SCR) system which removes nitrogen oxides in the exhaust gas of the diesel engine 1. As shown in FIGS. 1 and 2, an oxidation catalyst 30 and a soot filter 31 are inwardly provided in the first case 28 serving as the DPF case. An SCR catalyst 32 for reducing the urea selective catalyst and an oxidation catalyst 33 are inwardly provided in the second case 29 serving as the SCR case.

The exhaust gas discharged out of the cylinders of the diesel engine 1 to the exhaust manifold 6 is discharged outward via the exhaust gas purification device 27. The exhaust gas purification device 27 is adapted to reduce carbon monoxide (CO), carbon hydride (HC), particulate matter (PM), and nitrogen oxides (NOx) in the exhaust gas of the diesel engine 1.

Figure 4:
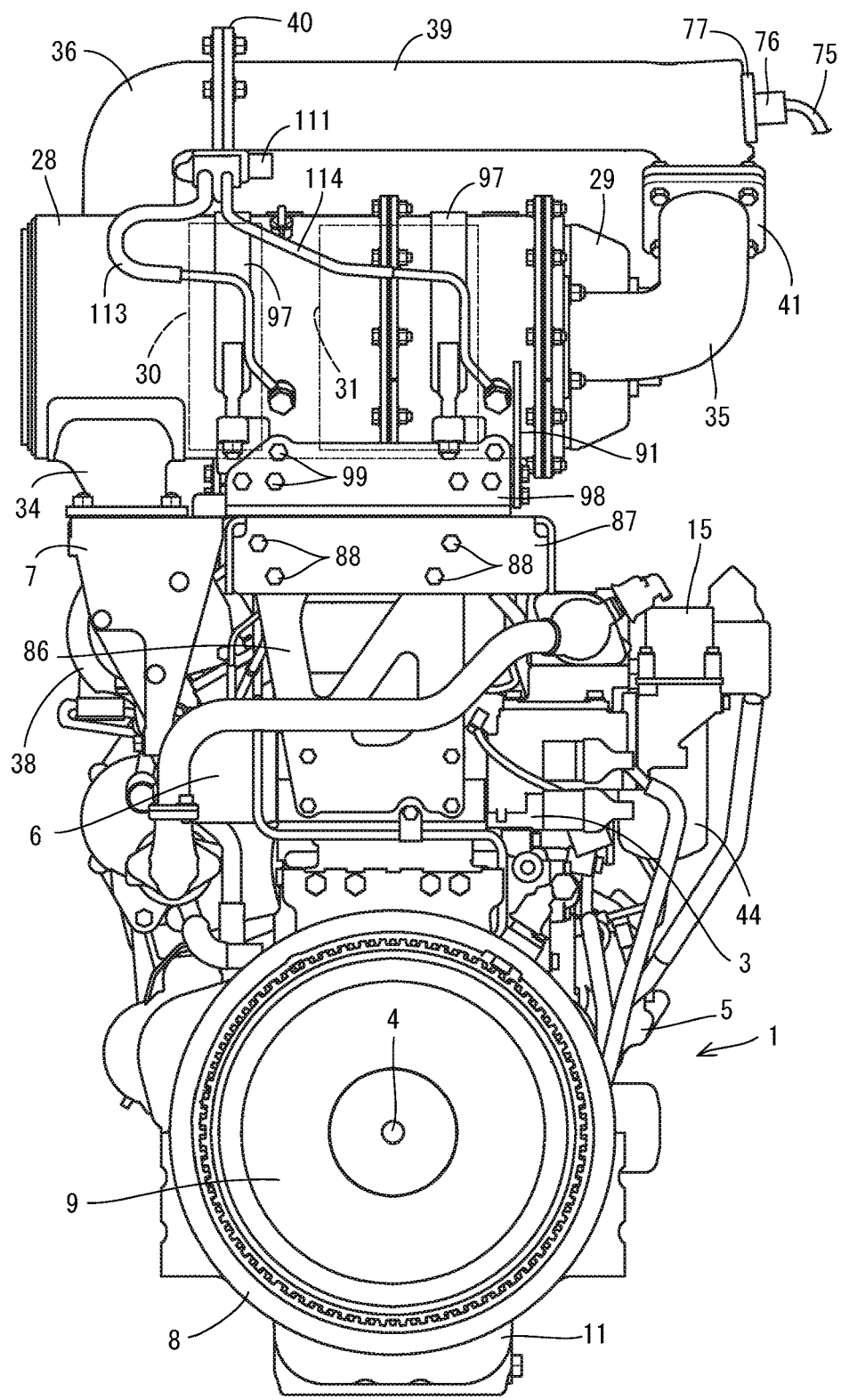
FIG. 4 is a back elevational view of the same.
Figure 5:
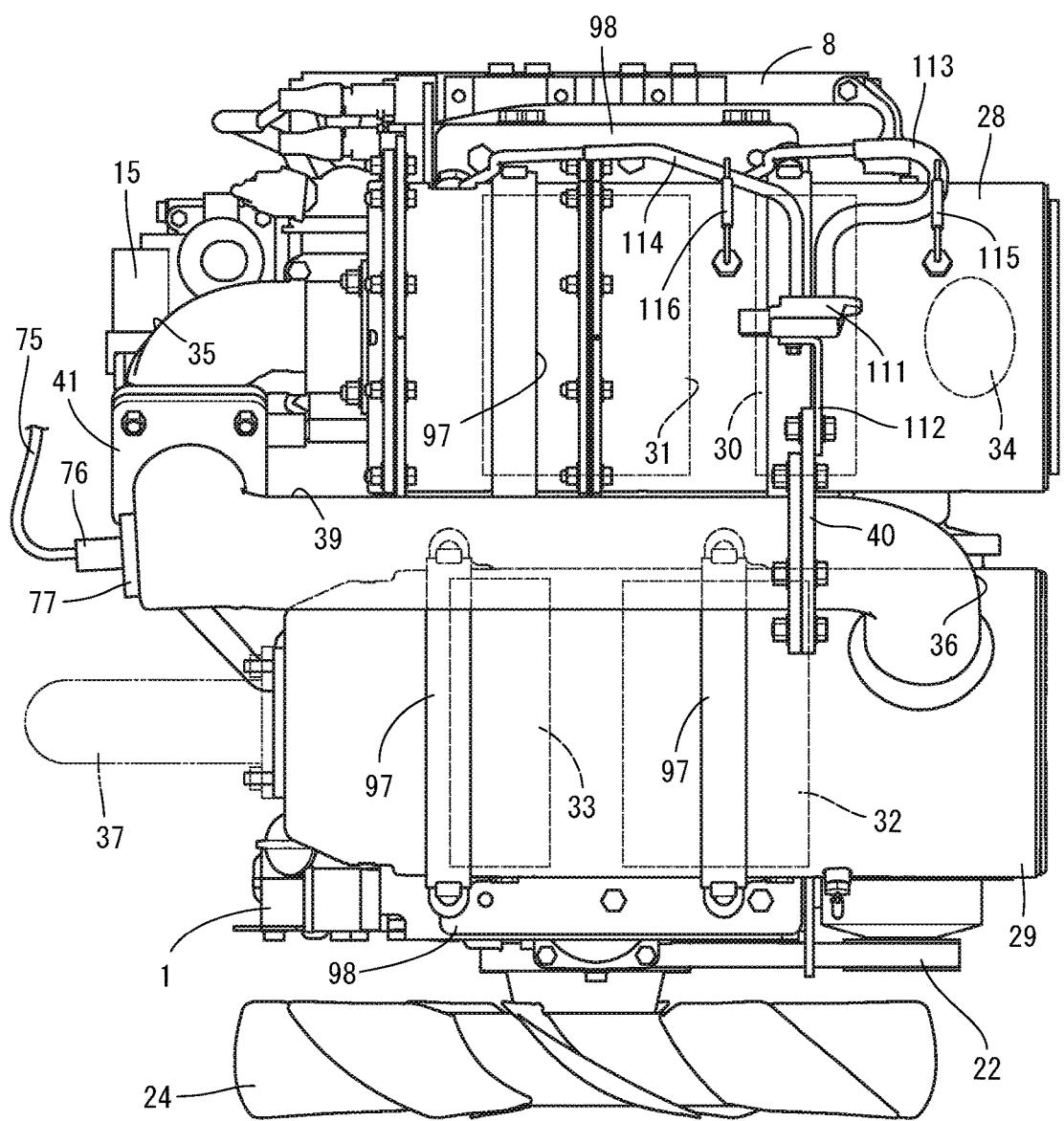
FIG. 5 is a plan view of the same.
Figure 6:
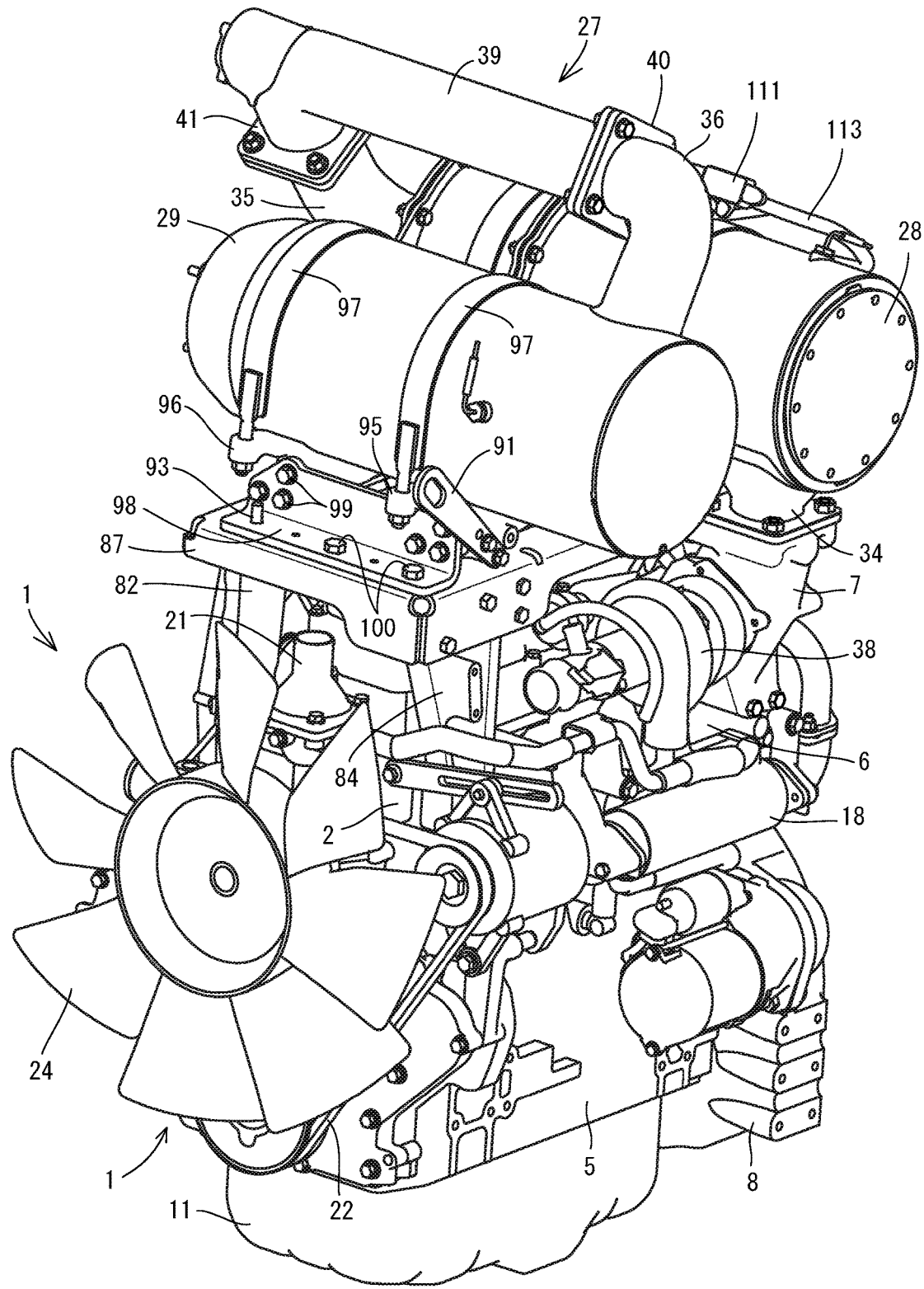
FIG. 6 is a front elevational perspective view of the same.
Figure 7:
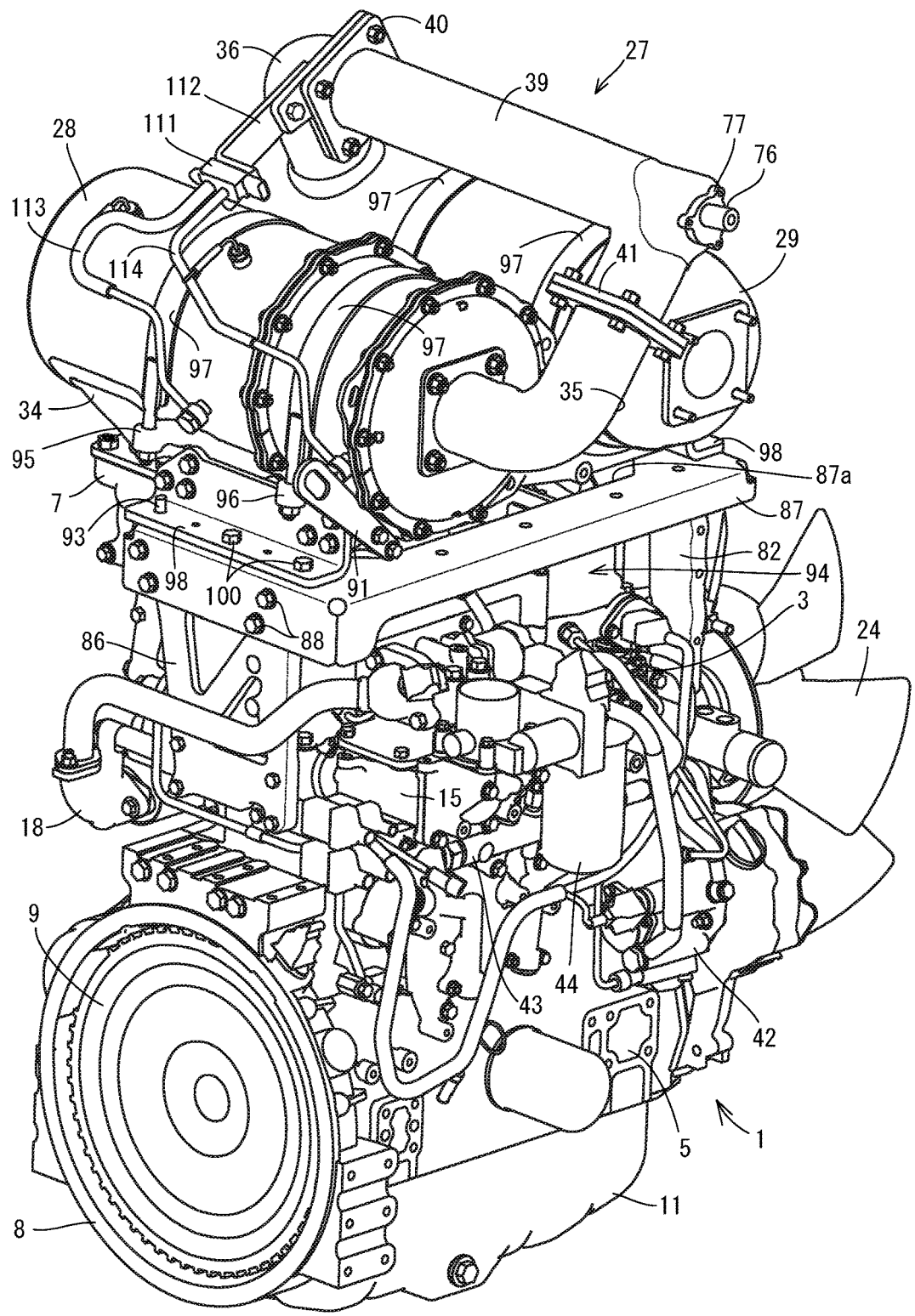
FIG. 7 is a back elevational perspective view of the same.
Figure 8:
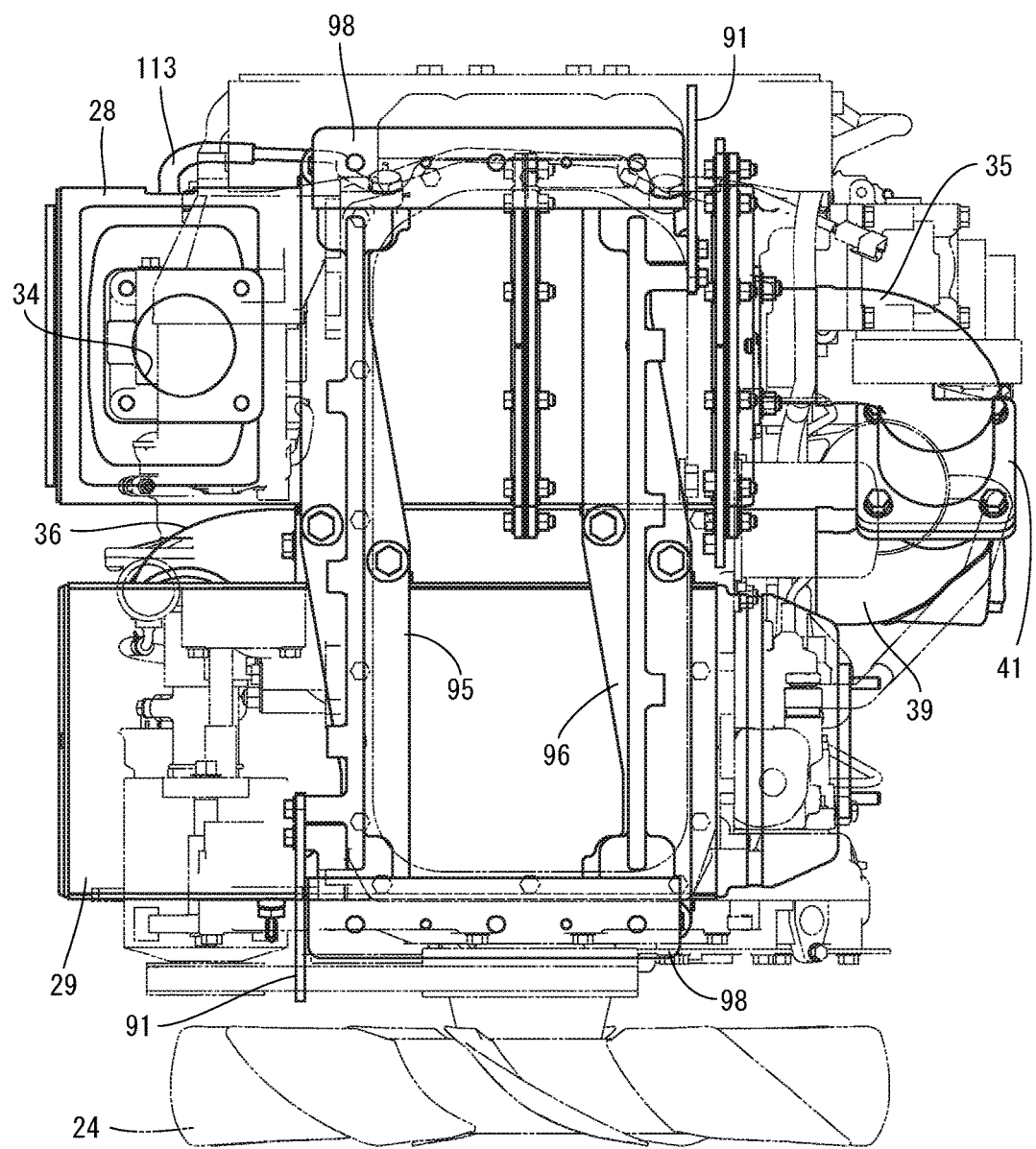
FIG. 8 is a bottom elevational explanatory view of an exhaust gas purification unit body.
Figure 9:
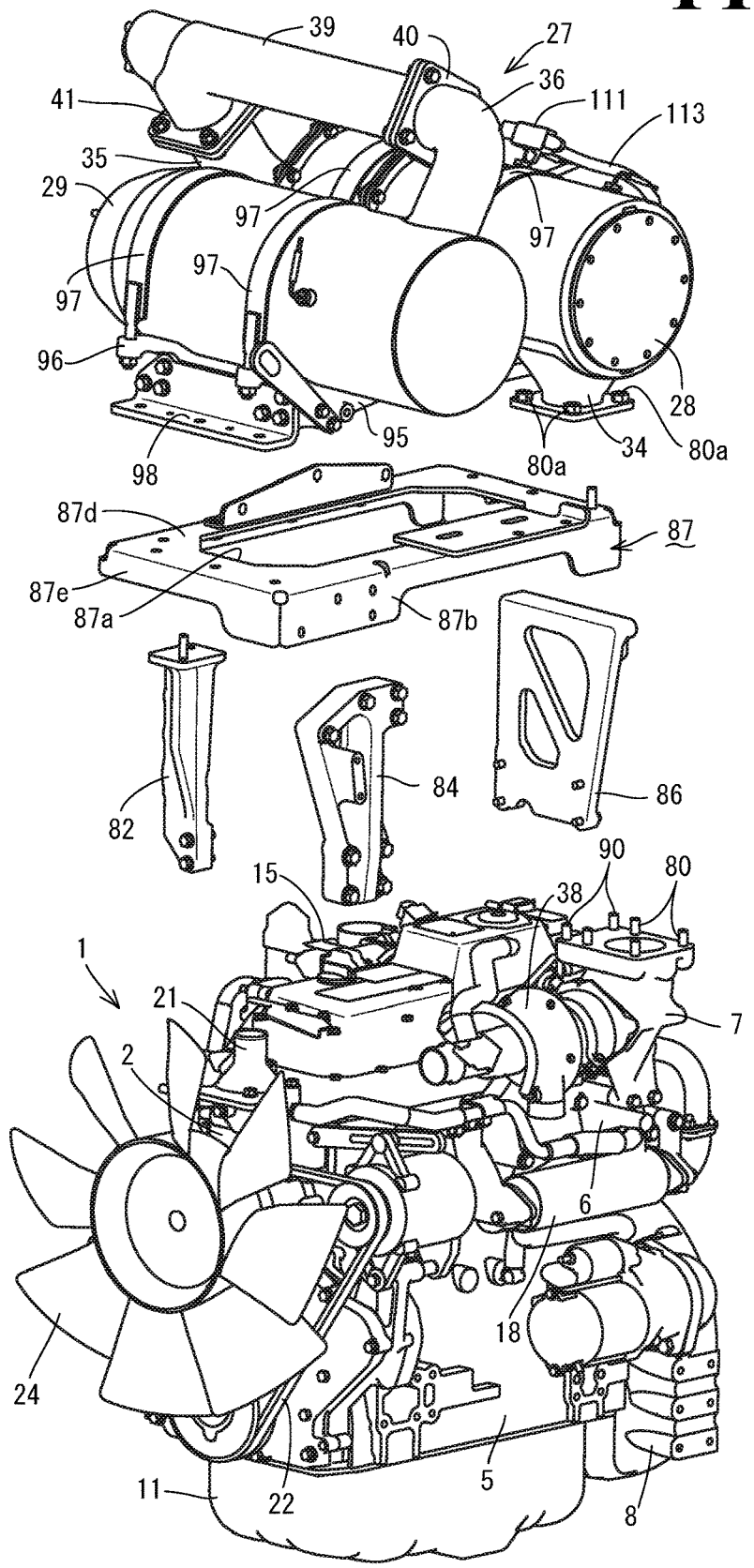
FIG. 9 is a front elevational perspective exploded view of the same.
Figure 10:
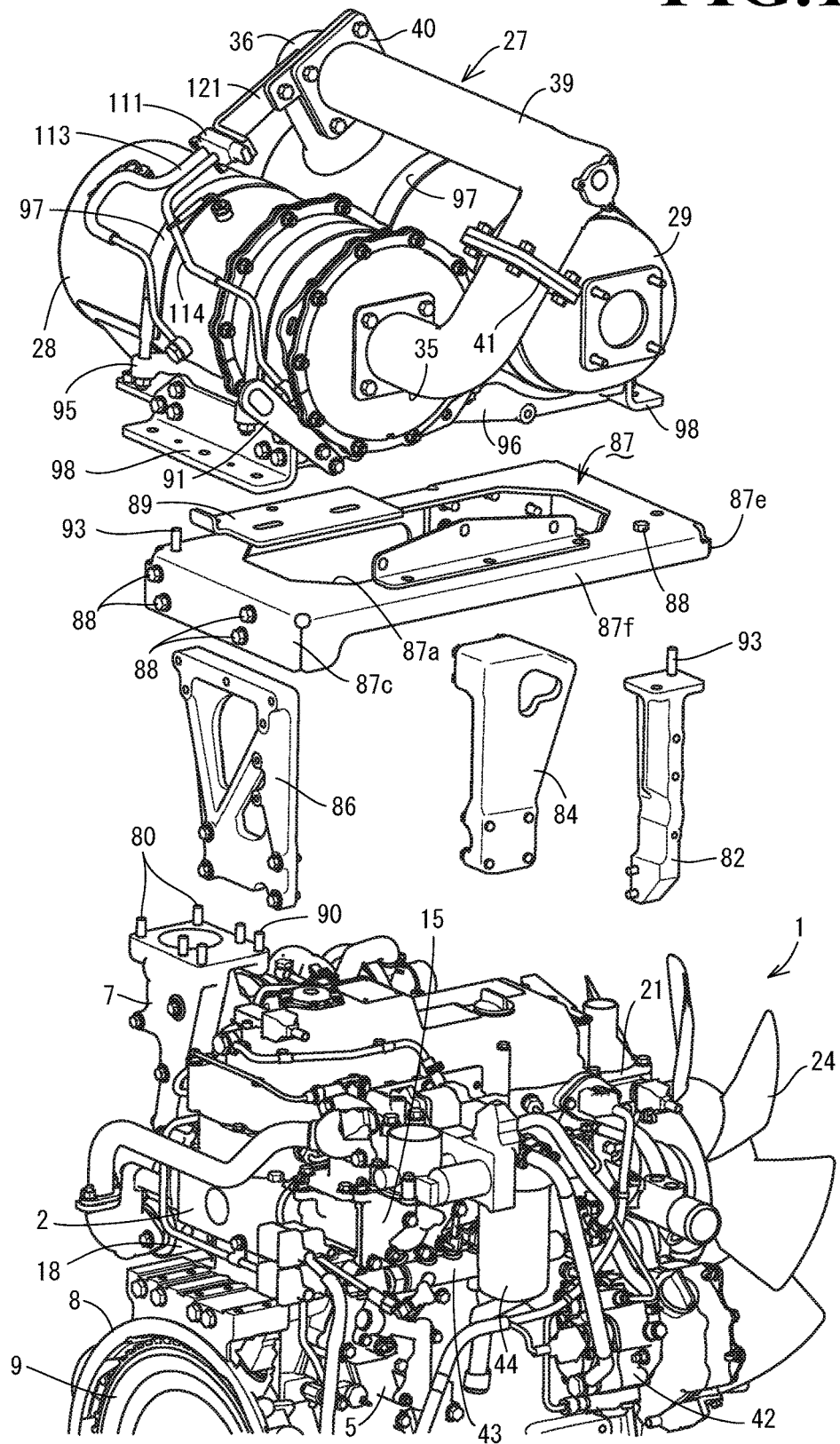
FIG. 10 is a back elevational perspective exploded view of the same.
Figure 11:
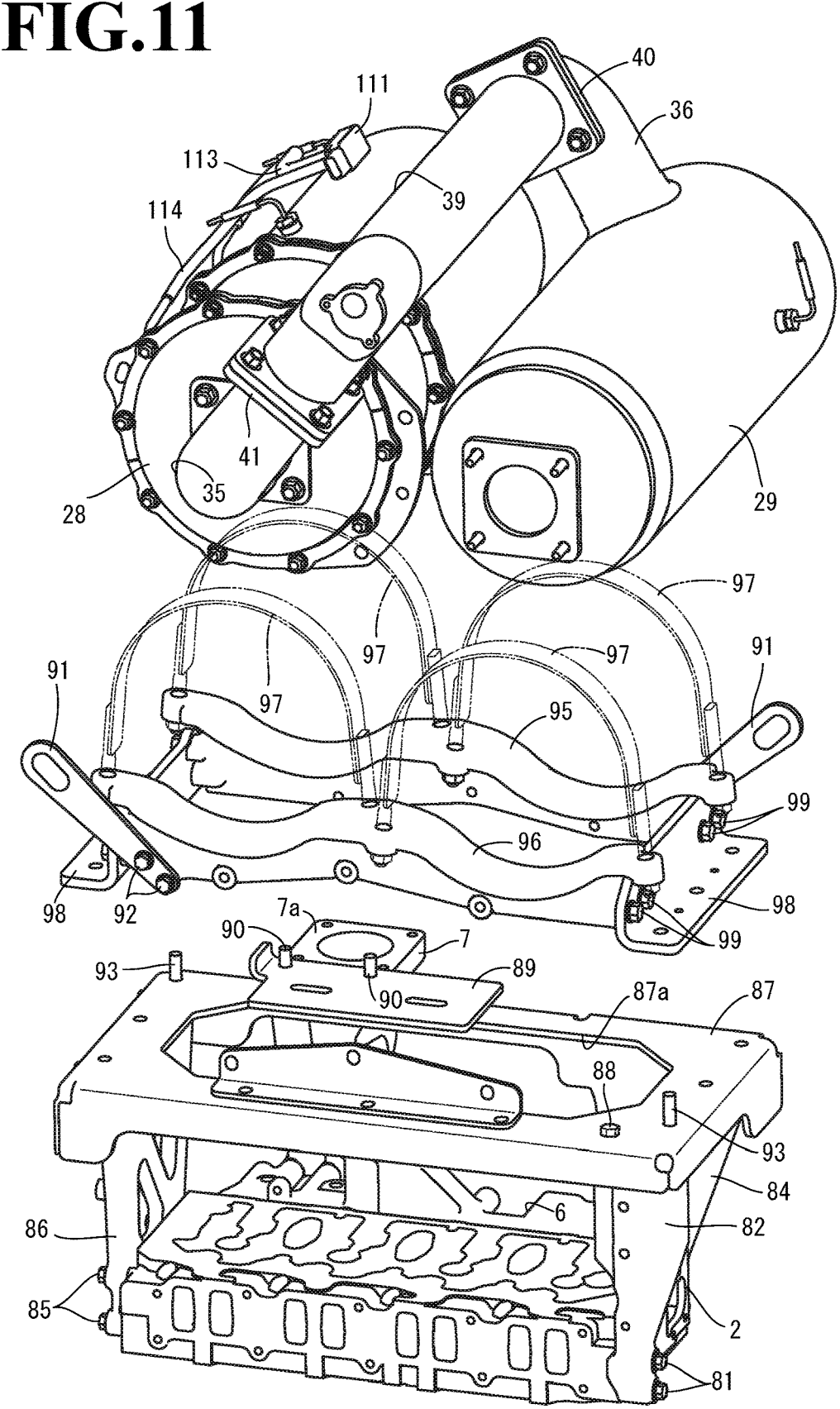
FIG. 11 is a right side elevational perspective exploded view of the same.
Figure 12:
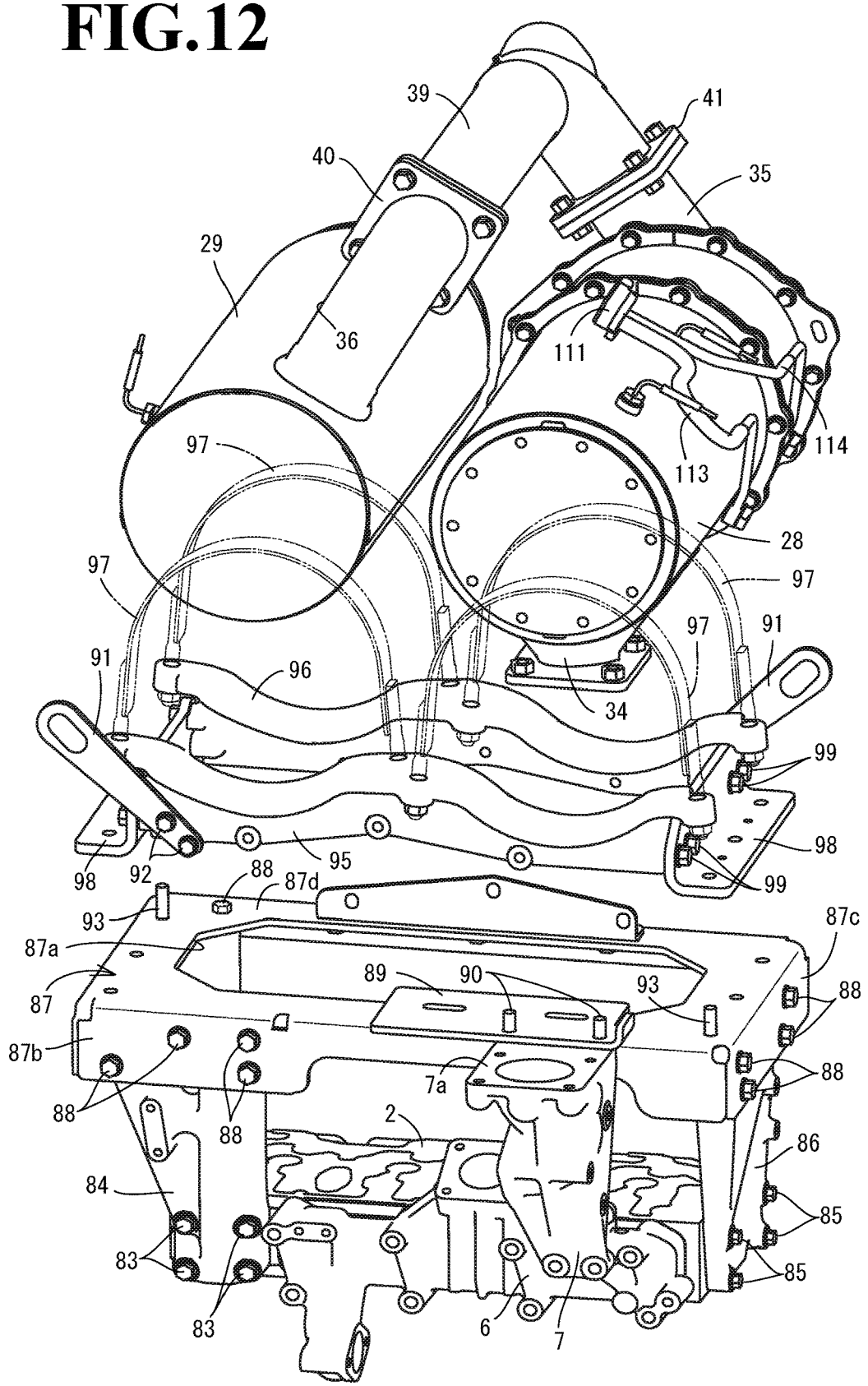
FIG. 12 is a left side elevational perspective exploded view of the same.

The first case 28 and the second case 29 are formed into a long cylindrical shape which extends long in an orthogonal direction intersecting the output shaft (the crank shaft) 4 of the diesel engine 1 in a plan view (refer to FIGS. 3 to 5). A DPF inlet pipe 34 taking into the exhaust gas, and a DPF outlet pipe 35 discharging the exhaust gas are provided in both sides (one end side and the other end side in an exhaust gas moving direction) of a tubular shape of the first case 28. In the same manner, an SCR inlet pipe 36 taking into the exhaust gas, and an SCR outlet pipe 37 discharging the exhaust gas are provided in both sides (one end side and the other end side in the exhaust gas moving direction) of the second case 29.

Further, a supercharger 38 forcibly feeding air into the diesel engine 1, and an exhaust gas outlet pipe 7 fastened by bolts to the exhaust manifold 6 are arranged in an exhaust gas outlet of the exhaust manifold 6. The exhaust gas of the diesel engine 1 is adapted to be introduced into the first case 28 by communicating the DPF inlet pipe 34 with the exhaust manifold 6 via the supercharger 38 and the exhaust gas outlet pipe 7, and the exhaust gas of the first case 28 is adapted to be introduced into the second case 29 by connecting the SCR inlet pipe 36 to the DPF outlet pipe 35 via a urea mixing pipe 39. In addition, the DPF outlet pipe 35 and the urea mixing pipe 39 are detachably connected by a DPF outlet side flange body 41 which is fastened by bolts. The SCR inlet pipe 36 and the urea mixing pipe 39 are detachably connected by an SCR inlet side flange body 40.

As shown in FIG. 2, each of injectors (not shown) for multiple cylinders of the diesel engine 1 is provided with a fuel pump 42 to which a fuel tank 45 shown in FIG. 13 (FIG. 14) is connected and a common rail 43. The common rail 43 and a fuel filter 44 are arranged in a side where the intake manifold 3 is installed in the cylinder 2, and the fuel pump 42 is arranged in a cylinder block 5 below the intake manifold 3. Each of the injectors has an electromagnetic opening and closing control type fuel injection valve (not shown).

The fuel within the fuel tank 45 is sucked into the fuel pump 42 via the fuel filter 44. Meanwhile, the common rail 43 is connected to the discharge side of the fuel pump 42, and the cylindrical common rail 43 is connected to each of the injectors of the diesel engine 1. A surplus of the fuel which is pressure fed to the common rail 43 from the fuel pump 42 is returned to the fuel tank 45, the high-pressure fuel is temporarily stored in the common rail 43, and the high-pressure fuel in the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve in each of the injectors is controlled to be opened and closed. As a result, the high-pressure fuel in the common rail 43 is injected to each of the cylinders of the diesel engine 1. In other words, an injection pressure, an injection timing, and an injection period (an injection amount) can be controlled with a high precision by electronically controlling the fuel injection valve in each of the injectors. Therefore, it is possible to reduce the nitrogen oxides (NOx) discharged out of the diesel engine 1.

Figure 14:
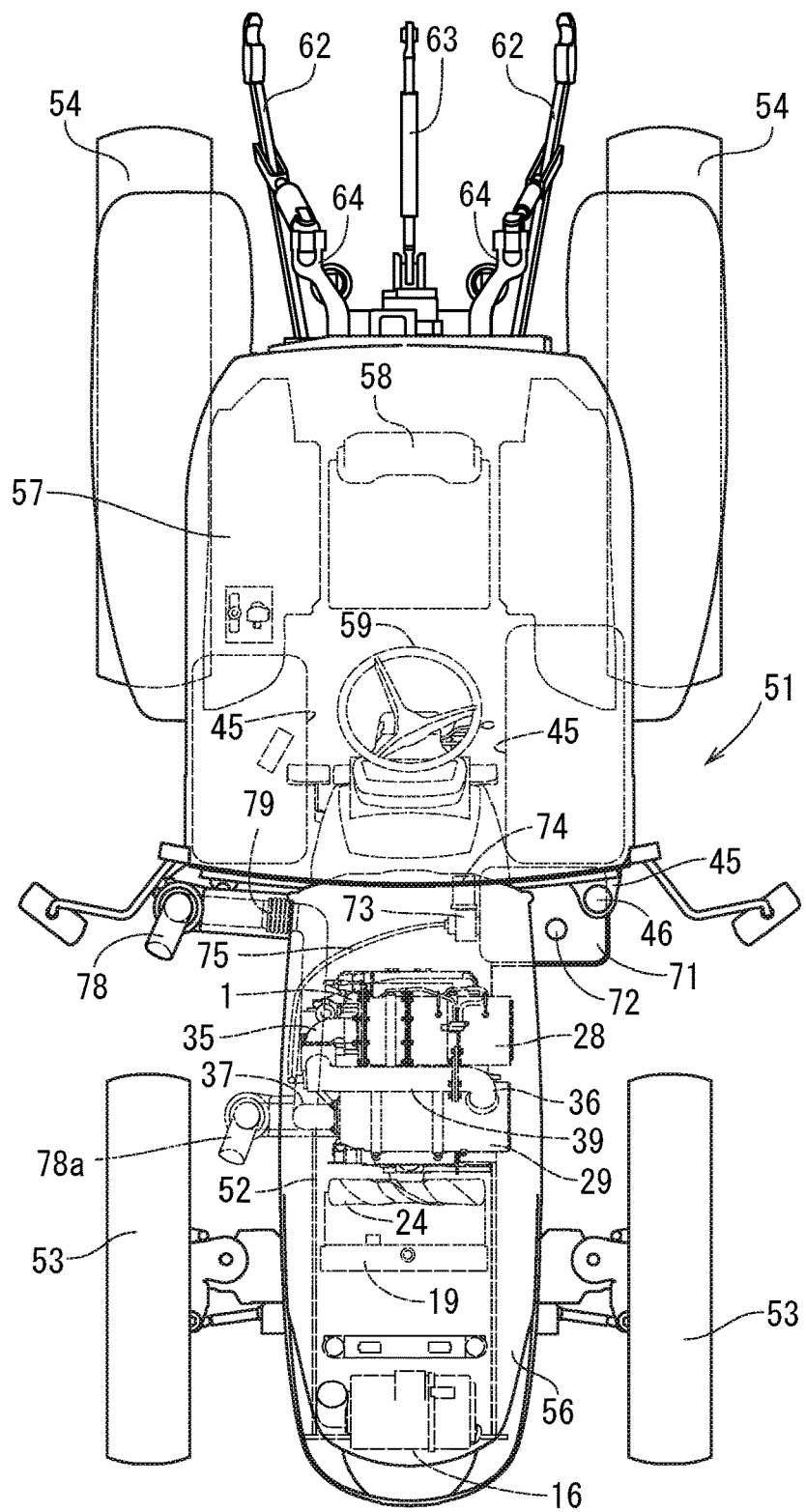
FIG. 14 is a plan view of the same.

Next, a description will be given of a tractor 51 which mounts the diesel engine 1 thereon with reference to FIGS. 13 and 14. The tractor 51 serving as the working vehicle shown in FIGS. 13 and 14 is adapted to perform a tilling work for tilling a farm field by being installed a tilling work machine (not shown). FIG. 13 is a side elevational view of a tractor for an agricultural work, and FIG. 14 is a plan view of the same. In the following description, a left side in a direction toward a forward moving direction of the tractor is simply called as a left side, and a right side in the direction toward the forward moving direction is simply called as a right side.

As shown in FIGS. 13 and 14, the tractor 51 for the agricultural work serving as the working vehicle is adapted to travel forward and backward by supporting a travel machine body 52 by a pair of right and left front wheels 53 and a pair of right and left rear wheels 54, mounting the diesel engine 1 to a front portion of the travel machine body 52, and driving the rear wheels 54 and the front wheels 53 by the diesel engine 1. The upper surface side and both the right and left side surfaces of the diesel engine 1 are covered with a hood 56 which can be opened and closed.

Further, a cabin 57 for an operator to get on is installed in a rear side of the hood 56 among the upper surface of the travel machine body 52. An inner portion of the cabin 57 is provided with a control seat 58 on which the operator seats, and control instruments such as a control steering wheel 59 serving as a steering means. Further, a pair of right and left steps 60 for the operator to get on and off are provided in right and left outside portions of the cabin 57, and a fuel tank 45 for supplying the fuel to the diesel engine 1 is provided in a lower side of a bottom portion of the cabin 57 and inside the step 60.

Further, the travel machine body 52 is provided with a transmission case 61 for changing speed of the output from the diesel engine 1 so as to transmit it to the rear wheels 54 (the front wheels 53). The tilling work machine (not shown) is coupled to a rear portion of the transmission case 61 via a lower link 62, a top link 63, and a lift arm 64 so as to be movable up and down. Further, a PTO shaft 65 driving the tilling work machine is provided in a rear side surface of the transmission case 61. The travel machine body 52 of the tractor 51 is constructed by the diesel engine 1, the transmission case 61, and a crutch case 66 coupling them.

Further, a description will be given of an attachment structure of the first case 28 and the second case 29 with reference to FIGS. 1 to 12, FIGS. 15 to 17, and FIGS. 22 to 27. As shown in FIGS. 9 to 12, FIGS. 15 to 17, and FIGS. 22 to 27, there are provided a front portion support leg body 82 which is fastened its lower end side by bolts 81 to a right corner portion in the front surface of the cylinder head 2, a side portion support leg body 84 which is fastened its lower end side by bolts 83 to a front corner portion in the left side surface of the cylinder head 2, and a rear portion support leg body 86 which is fastened its lower end side by bolts 85 to the rear surface of the cylinder head 2, and the support leg bodies 82, 84, and 86 are provided in a rising manner in the cylinder head 2. A rectangular support base 87 formed by a sheet metal processing is provided, and a side surface and an upper surface side of the support base 87 are fastened by bolts 88 to upper end sides of the support leg bodies 82, 84, and 86. Further, a tabular positioning body 89 is fixed by welding to the upper surface of the support base 87 provided to face to the exhaust gas outlet pipe 7, a part of a tabular lower surface of the positioning body 89 is brought into surface contact with a part of a tabular exhaust gas outlet surface 7a of the exhaust gas outlet pipe 7 which is open upward, and the positioning body 89 is fastened by positioning bolts 90 to the exhaust gas outlet pipe 7. The upper surface of the support base 87 is adapted to be approximately horizontal to the diesel engine 1 on the basis of the surface contact between the exhaust gas outlet pipe 7 and the positioning body 89. When the exhaust gas outlet pipe 7 is assembled in the diesel engine 1 or before the support base 87 is attached, a lower end side of the positioning bolt 90 is threadably attached to the exhaust gas outlet pipe 7, and the positioning bolt 90 is provided in a rising manner upward from the exhaust gas outlet surface 7a.

As shown in FIGS. 11 and 12 and FIGS. 15 to 17, a pair of left case fixing body 95 and right case fixing body 96 and four fastening bands 97 are provided as a pinching body which arranges the first case 28 and the second case 29 in parallel. The first case 28 is firmly fixed to rear side mounting portions of the left case fixing body 95 and the right case fixing body 96 by the left and right fastening bands 97, and the second case 29 is firmly fixed to front side mounting portions of the left case fixing body 95 and the right case fixing body 96 by the left and right fastening bands 97. Therefore, the cylindrical first case 28 and the second case 29 which are long in the lateral direction are arranged in parallel to the upper surface side of the diesel engine 1, the first case 28 is positioned in the rear side of the upper surface of the diesel engine 1, and the second case 29 is positioned in the front side of the upper surface of the diesel engine 1.

As shown in FIGS. 9 to 12 and FIG. 17, front and rear support frame bodies 98 are fastened by bolts 99 to front and rear end portions of the left case fixing body 95 and the right case fixing body 96 so as to be adjustable their attachment positions (support attitudes), the left and right case fixing bodies 95 and 96 and the front and rear support frame bodies 98 are connected like a quadrangular frame shape, and the first case 28 and the second case 29 are firmly fixed thereto via the fastening bands 97, thereby constructing the exhaust gas purification device 27 serving as the exhaust gas purification unit. The bolt 99 is loosely fitted and inserted to a bolt through hole of the support frame body 98 by forming an inner diameter of the bolt through hole of the support frame body 98 larger than an outer diameter of the bolt 99, and the support frame body 98 is adapted to be fastened by the bolts 99 to the case fixing bodies 95 and 96 by threadably attaching the bolts 99 to the case fixing bodies 95 and 96 while supporting the connection attitude of the support frame bodies 98 to the case fixing bodies 95 and 96 in a predetermined attitude when the case fixing bodies 95 and 96 are firmly fixed to the support frame bodies 98.

Further, left and right suspension members 91 are fastened by bolts 92 to a front end side of the left case fixing body 95 and a rear end side of the right case fixing body 96, and the left and right suspension members 91 are arranged at diagonal positions of the quadrangular frame of the left and right case fixing bodies 95 and 96 and the front and rear support frame bodies 98. Meanwhile, front and rear temporary fixing bolt bodies 93 are provided in a rising manner on an upper surface of the approximately horizontal support base 87, and the front and rear temporary fixing bolt bodies 93 are arranged at diagonal positions which are opposite sides to the diagonal layout of the left and right suspension members 91. More specifically, the left and right suspension members 91 and the front and rear temporary fixing bolt bodies 93 are arranged in a sorting manner at apex angle positions of the quadrangular frame of the left and right case fixing bodies 95 and 96 and the front and rear support frame bodies 98.

Next, a description will be given of an assembling procedure for assembling the exhaust gas purification device 27 (the exhaust gas purification unit) in the diesel engine 1. As shown in FIGS. 9 to 12, the exhaust gas purification device 27 as an exhaust gas purification unit is first of all assembled. A pair of support frame bodies 98 formed into an L-shape in their end surfaces and made of a sheet metal are fastened by the bolts 99 to both end portions of the left case fixing body (the pinching body) 95 and the right case fixing body (the pinching body) 96. When fastening the bolts 99, the case fixing bodies 95 and 96 and the support frame bodies 98 are connected like the quadrangular frame shape by fastening the bolts 99 while adjusting the connection positions of the case fixing bodies 95 and 96 and the support frame bodies 98 with the use of backlash between the bolt holes of the support frame bodies 98 and the bolts 99 so that the upper surface height of the left case fixing body 95 is flush with the upper surface height of the right case fixing body 96.

Subsequently, the first case 28, the second case 29, and the urea mixing pipe 39 are integrally connected by fastening the other end side of the urea mixing pipe 39 by bolts to the SCR inlet pipe 36 via the SCR inlet side flange body 40 as well as mounting the first case 28 and the second case 29 in a predetermined direction (in parallel) to an upward concave support portion in the upper surface side of the case fixing bodies 95 and 96, and fastening the DPF outlet side flange body 41 by bolts to the DPF outlet pipe 35. Further, the assembly of the exhaust gas purification device 27 is finished by fastening the suspension members 91 by the bolts 92 to the case fixing bodies 95 and 96 as well as installing the respective two fastening bands 97 to the respective upper surface sides of the first case 28 and the second case 29 like a half winding manner, and fastening the lower end sides of the fastening bands 97 by bolts to the case fixing bodies 95 and 96. A differential pressure sensor 111 is attached to a sensor bracket 112 by fastening the sensor bracket 112 by bolts to the SCR inlet side flange body 40 when the SCR inlet side flange body 40 is fastened by bolts.

Meanwhile, the support leg bodies 82, 84, and 86 are provided in a rising manner in the cylinder head 2 by fastening the respective lower end sides of the front portion support leg body 82, the side portion support leg body 84, and the rear portion support leg body 86 by the bolts 81, 83, and 85 to the cylinder head 2 of the diesel engine 1 which is substantially finished its assembling work, near the final assembling step of the assembly line (the engine assembly place) of the diesel engine 1. Next, the support base 87 is fixed in a horizontal attitude to the upper surface side of the diesel engine 1 by fastening the support base 87 by the bolts 88 to the support leg bodies 82, 84, and 86 under a state in which the upper surface of the support base 87 is supported approximately horizontally by mounting the support base 87 to the upper end sides of the support leg bodies 82, 84, and 86 and bringing the lower surface of the positioning body 89 into surface contact with the exhaust gas outlet surface 7a of the exhaust gas outlet pipe 7.

Further, the assembling work for assembling the exhaust gas purification device 27 in the diesel engine 1 is finished by mounting the front and rear support frame bodies 98 to the approximately horizontal upper surface of the support base 87 from the above side via the front and rear temporary fixing bolt bodies 93, fastening the front and rear support frame bodies 98 by bolts 100 to the support base 87, and combining the exhaust gas purification device 27 (the first case 28 and the second case 29) with the upper surface side of the diesel engine 1 as well as suspending the exhaust gas purification device 27 which is finished its assembly as mentioned above to a material handling attachment (a hoist or a chain block) which is not illustrated, via the suspension member 91, in the work place near the end of the assembly step of the diesel engine 1, and conveying the exhaust gas purification device 27 to the upper surface side of the diesel engine 1 in which the support base 87 is assembled as mentioned above.

Further, the urea mixing pipe 39 is arranged between the first case 28 and the second case 29 in parallel to them. The first case 28, the second case 29, and the urea mixing pipe 39 are supported via the upper surface of the support base 87 at the position which is higher than a cooling air path (a shroud 101 shown in FIG. 1) of the cooling fan 24, and the front side (the lateral side) of the urea mixing pipe 39 is closed by the second case 29. A temperature of the exhaust gas within the urea mixing pipe 39 is prevented from being lowered by the cooling air of the cooling fan 24 and the like, and the urea water supplied into the urea mixing pipe 39 is prevented from being crystallized. Further, the urea water supplied into the urea mixing pipe 39 is adapted to be mixed as ammonia in the exhaust gas running into the second case 29 from the first case 28.

As shown in FIGS. 1 to 12, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the case fixing bodies 95 and 96 are provided for firmly fixing the first case 28 and the second case 29, and the suspension member 91 is firmly fixed to the case fixing bodies 95 and 96. Therefore, the exhaust gas purification device 27 is supported in a suspension manner to the material handling attachment via the suspension member 91 in a state in which the cases 28 and 29 are integrally assembled as the exhaust gas purification device (the exhaust gas purification unit) 27 by the case fixing bodies 95 and 96. The exhaust gas purification device 27 which is a mass-production part can be easily handled in an assembling and disassembling work for attaching and detaching the exhaust gas purification device 27 to and from the upper surface side of the diesel engine 1.

As shown in FIGS. 1 to 12, the exhaust gas purification device 27 serving as the exhaust gas purification unit is formed by connecting the urea mixing pipe 39 between the first case 28 and the second case 29 which are firmly and integrally fixed by the case fixing bodies 95 and 96, and a pair of suspension members 91 are arranged in a facing manner to the outer peripheral sides of the diagonal positions in a plan view in the outer peripheral side of the exhaust gas purification device 27. Therefore, the exhaust gas purification device 27 can be easily assembled in the diesel engine 1 in the assembly step near the end of the assembly step of the diesel engine 1, and the exhaust gas purification device 27 can be easily detached from the diesel engine 1 in a maintenance work or a repair work of the diesel engine 1.

As shown in FIGS. 1 to 12, the lower surface side of the support base 87 is connected to the upper surface side of the diesel engine 1 via a plurality of support leg bodies 82, 84, and 86, the support base 87 is arranged in the upper surface side of the diesel engine 1, and the case fixing bodies 95 and 96 are firmly fixed detachably to the approximately horizontal upper surface side of the support base 87. Therefore, it is possible to easily improve an assembly workability of the diesel engine 1 or a maintenance workability of the diesel engine 1 while it is possible to easily reduce the upper surface side of the diesel engine 1 from being interfered with the attached part and the like. Meanwhile, the vent hole 87a is formed in the support base 87 in the lower surface side of the first case 28 or the second case 29, and the air passage 94 is formed between the diesel engine 1 and each of the cases 28 and 29 by the portions between a plurality of support leg bodies 82, 84, and 86, and the vent hole 87a, as shown in FIGS. 7 to 12 and FIGS. 15 to 17. As a result, it is possible to easily suppress the temperature rise in the outer peripheral portion in the upper surface side of the diesel engine 1 facing to the lower surface side of the first case 28 or the second case 29, and it is possible to improve the durability of the attached part (the sensor harness) in the upper surface side of the diesel engine 1.

As shown in FIGS. 1 to 12, in the structure in which the cooling fan 24 is provided in one side of the diesel engine 1, the height of the approximately horizontal upper surface of the support base 87 is formed higher than the height of the upper portion of the cooling fan 24. Therefore, it is possible to prevent the temperature of the exhaust gas purification device 27 serving as the exhaust gas purification unit from being lowered by the wind of the cooling fan 24, and it is possible to keep the exhaust gas purification device 27 at a predetermined temperature or higher so as to improve an exhaust gas purification efficiency, while an air cooling efficiency of the diesel engine 1 can be appropriately maintained by moving the wind of the cooling fan 24 to the lower surface side of the support base 87.

As shown in FIGS. 1 to 12, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the exhaust gas purification device 27 is formed by firmly and integrally fixing the first case 28 and the second case 29 by the case fixing bodies 95 and 96, the fastening bands 97, and the support frame bodies 98 which serve as the pinching body, and the exhaust gas purification device 27 serving as the exhaust gas purification unit is adapted to be detachably supported to the diesel engine via the case fixing bodies 95 and 96, the fastening bands 97, and the support frame bodies 98. Therefore, the diesel engine 1 and the exhaust gas purification device 27 can be integrally constructed into the same vibration structure, and it is possible to construct the exhaust gas discharge channel in the diesel engine 1 and the exhaust gas purification device 27 at a low cost without necessity of vibration isolation connection of the exhaust connection portions of the first case 28 and the second case 29. Further, the exhaust gas purification device 27 can be previously assembled in the different place from the assembling work place of the diesel engine 1, and the exhaust gas purification device 27 can be mounted to the diesel engine 1 near the final step of the assembling work of the diesel engine 1. As a result, it is possible to improve the assembly workability of the diesel engine 1.

As shown in FIGS. 1 to 12, the support base 87 is firmly fixed approximately horizontally to the upper surface side of the diesel engine 1, the case fixing bodies 95 and 96 are firmly fixed to the upper surface side of the support base 87 via the support frame body 98, the first case 28 and the second case 29 are supported in a sideways falling attitude to the upper surface side of the diesel engine 1 via the case fixing bodies 95 and 96 and the fastening bands 97, and the urea mixing pipe 39 is supported between the first case 28 and the second case 29 to the upper surface sides thereof. Therefore, the exhaust gas purification device 27 can be easily assembled and disassembled by connecting and disconnecting the support base 87 and the support frame body 98, and the first case 28 and the second case 29 can be compactly supported to the upper surface side of the diesel engine 1 at a low level. Further, it is possible to maintain the attachment distance between the first case 28 and the second case 29 constant via the case fixing bodies 95 and 96 and the fastening bands 97, and it is possible to simplify an exhaust gas piping structure of the urea mixing pipe 39 and the like between the cases 28 and 29.

As shown in FIGS. 9 to 12, the exhaust gas purification device 27 is adapted to be mounted to the upper surface side of the diesel engine 1 via the support base 87 by firmly fixing the lower end sides of a plurality of support leg bodies 82, 84, and 86 to the outer peripheral surface of the cylinder head 2 of the diesel engine 1, and detachably connecting the approximately horizontal support base 87 to the upper end sides of a plurality of support leg bodies 82, 84, and 86. Therefore, it is possible to easily execute a maintenance work of the upper surface side of the diesel engine 1 by attaching and detaching the connection portions between a plurality of support leg bodies 82, 84, and 86, and the support base 87, disconnecting the support base 87, and leaving the upper surface side of the diesel engine 1 open widely. Further, the support base 87 can be firmly connected to the cylinder head 2 via a plurality of support leg bodies 82, 84, and 86, and the exhaust gas purification device 27 can be supported with a high rigidity to the upper surface side of the diesel engine 1.

As shown in FIGS. 1 to 7, the exhaust gas purification device 27 is supported within a width in a core wire direction of the output shaft 4 of the diesel engine 1 via the support base 87, and a direction intersecting the core wire of the output shaft 4 of the diesel engine 1 is adapted to coincide with the exhaust gas moving direction of the first case 28 or the second case 29. Therefore, the exhaust gas purification device 27 can be supported in an attitude that the exhaust gas outlet of the second case 29 heads for the intake manifold 3 side of the diesel engine 1 by aiming the exhaust gas inlet of the first case 28 to the exhaust manifold 6 side of the diesel engine 1. It is possible to form the exhaust gas channel from the exhaust manifold 6 of the diesel engine 1 to the exhaust gas outlet of the second case 29 short, and it is possible to compactly mount the exhaust gas purification device 27 to the upper surface side of the diesel engine 1.

Meanwhile, the exhaust gas purified by the second case 29 is discharged from a tail pipe 78 toward an upper side of the cabin 57 by disposing the tail pipe 78 in a rising manner on a front surface of a right corner portion of the cabin 57 in the front surface of the cabin 57, extending a lower end side of the tail pipe 78 toward an inner portion of the hood 56, and connecting a lower end side of the tail pipe 78 to the SCR outlet pipe 37 via a bellows tubular flexible pipe 79, as shown in FIGS. 13 to 14. The machine vibration transmitted to the tail pipe 78 side from the diesel engine 1 side is reduced by the connection of the flexible pipe 79. Further, a urea water tank 71 is installed to a left side portion of the hood 56 in an opposite side to a right side portion where the tail pipe 78 is arranged, in the front surface of the cabin 57. More specifically, the urea water tank 71 is arranged in a sorting manner in the left side portion of the rear portion of the hood 56 while the tail pipe 78 is arranged in the right side portion of the rear portion of the hood 56. As shown by virtual lines in FIGS. 13 and 14, the tail pipe 78 can be integrally connected to the SCR outlet pipe 37 and the flexible pipe 79 can be omitted, in a structure having a tail pipe 78a which is firmly fixed to the diesel engine 1 side.

Further, the urea water tank 71 is mounted to the travel machine body 52 (a bottom portion frame of the cabin 57 and the like) in the leftward rear portion of the hood 56. An oil hole 46 of the fuel tank 45 and a water filler 72 of the urea water tank 71 are adjacently provided in a lower portion of a front surface in the left side of the cabin 57. The tail pipe 78 is arranged in the front surface in the right side of the cabin 57 where an operator gets on and off with low frequency, and the oil hole 46 and the water filler 72 are arranged in the front surface in the left side of the cabin 57 where the operator gets on and off with high frequency. The cabin 57 is structured such that the operator can get on and off the control seat 58 from any of the left side and the right side.

Further, as shown in FIGS. 3 to 5 and FIG. 14, there are provided a urea water injection pump 73 which pressure feeds the urea water solution within the urea water tank 71, an electric motor 74 which drives the urea water injection pump 73, and a urea water injection nozzle 76 which is connected to the urea water injection pump 73 via a urea water injection pipe 75. The urea water injection nozzle 76 is attached to the urea mixing pipe 39 via an injection pedestal 77, and the urea water solution is sprayed into an inner portion of the urea mixing pipe 39 from the urea water injection nozzle 76.

According to the structure mentioned above, the carbon monoxide (CO) and the carbon hydride (HC) in the exhaust gas of the diesel engine 1 can be reduced by the oxidation catalyst 30 and the soot filter 31 within the first case 28. Next, the urea water from the urea water injection nozzle 7 is mixed into the exhaust gas from the diesel engine 1 in the inner portion of the urea mixing pipe 39. Further, the nitrogen oxides (NOx) in the exhaust gas mixed with the urea water as ammonia is reduced by the SCR catalyst 32 and the oxidation catalyst 33 within the second case 29, and is discharged out of the tail pipe 78 toward the machine outside.

As shown in FIGS. 1 to 12 and FIG. 15, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the engine device is provided with the support leg bodies 82, 84, and 86 which are protruded from the diesel engine 1, and the support base 87 which is firmly fixed to the support leg bodies 82, 84, and 86, and the first case 28 and the second case 29 are adapted to be attached to the plane of the support base 87. Therefore, the support base 87 can be firmly and easily fixed to the diesel engine 1 via the support leg bodies 82, 84, and 86 according to a retrofitting work (near an end of the assembly step of the diesel engine 1), the first case 28 and the second case 29 can be supported to the support base 87 of the diesel engine 1 in an appropriate attitude, and it is possible to improve an attachment and detachment workability of the first case 28 and the second case 29.

As shown in FIGS. 1 to 12 and FIG. 15, the upper surface side of the support base 87 is adapted to be approximately horizontal when the support base 87 is fixed to the support leg bodies 82, 84, and 86, by bringing the plane of the support base 87 (the bottom surface of the positioning body 89) into surface contact with the horizontal surface (the exhaust gas outlet surface 7*a*) of the exhaust gas outlet portion (the exhaust gas outlet pipe 7) in the outer surface of the diesel engine 1, and joining the support base 87 to the outer surface of the diesel engine 1 via the horizontal surface (the exhaust gas outlet surface 7*a*) in the outer side of the diesel engine 1 and the plane of the support base 87 (the bottom surface of the positioning body 89). Therefore, the attachment strength can be easily secured by forming the support base 87 into a sheet metal structure having a high rigidity while an attachment angle of the support base 87 can be easily determined by the connection of the exhaust gas outlet pipe 7 (the exhaust gas outlet portion) and the support base 87. For example, it is possible to improve an assembly workability where the attachment angle of the support base 87 is formed horizontally to the diesel engine 1.

As shown in FIGS. 1 to 12 and FIG. 15, the upper surface side of the support base 87 is adapted to be approximately horizontal by firmly and integrally fixing the positioning body 89 to the support base 87, bringing the positioning body 89 into surface contact with the opening surface (exhaust gas outlet surface 7*a*) of the exhaust gas outlet portion (the exhaust gas outlet pipe 7) in the diesel engine 1, and joining the support base 87 to the diesel engine 1 side via the positioning body 89. Therefore, the support base 87 and the positioning body 89 can be connected according to a welding process or the like after the support base 87 is formed according to a press work or the like, so that the lower surface of the positioning body 89 can be formed precisely in parallel to the upper surface of the support base 87. The upper surface side of the support base 87 can be formed approximately horizontal by the surface contact between the diesel engine 1 side and the positioning body 89 without any special preparation of a connection jig of the support base 87. Since the positioning body 89 is provided as the connection jig of the support base 87, it is possible to easily execute the attaching and detaching work of the support base 87 even in a repairing place for the diesel engine 1 where the connection jig of the support base 87 is not prepared.

As shown in FIGS. 1 to 12 and FIG. 15, in the structure in which the first case 28 and the second case 29 are integrally formed into the exhaust gas purification unit (the exhaust gas purification device 27), the exhaust gas purification unit (the exhaust gas purification device 27) are adapted to be integrally attached to and detached from the flat upper surface side of the support base 87 which is firmly fixed its lower surface side to the support leg bodies 82, 84, and 86. Therefore, each of the cases 28 and 29 can be attached and detached as a single part, and it is possible to improve the assembly and disassembly workability of the cases 28 and 29 or the maintenance workability of the diesel engine 1.

As shown in FIGS. 1 to 8, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the diesel engine 1, the first case 28 and the second case 29 are adapted to be freely and integrally oscillated by firmly and integrally fixing the diesel engine 1, the first case 28, and the second case 29. Therefore, the diesel engine 1, the first case 28, and the second case 29 can be constructed as the same vibration structure, it is not necessary to connect the exhaust passage between the diesel engine 1 and the first case 28 or the exhaust passage between the first case 28 and the second case 29 in a vibration isolation manner, and it is possible to construct the exhaust gas channel structure between the diesel engine 1 and the second case 29 with a low cost. More specifically, since a vibration isolation member, for example, a bellows-like flexible pipe or a heat resistant rubber hose is not necessarily connected in the exhaust gas channel between the first case 28 and the second case 29, it is possible to construct the exhaust gas channel structure between the diesel engine 1 and the second case 29 with a low cost.

As shown in FIGS. 1 to 10, a plurality of support leg bodies 82, 84, and 86 are provided in a rising manner in the cylinder head 2 of the diesel engine 1, the support base 87 is connected to the upper end sides of a plurality of support leg bodies 82, 84, and 86, and the first case 28 and the second case 29 are firmly fixed to the upper surface side of the diesel engine 1 via the approximately horizontal support base 87. Therefore, the support base 87 can be easily spaced from the attached parts of the diesel engine 1. Further, the first case 28 and the second case 29 can be firmly fixed to the cylinder head 2 with a high rigidity as well as the exhaust gas piping of each of the cases 28 and 29 can be simplified by integrally attaching the first case 28 and the second case 29 to the diesel engine 1. In addition, it is possible to absorb a working error or the like of the attachment part such as the support base 87, it is possible to easily compensate an angle of incline for the attachment of the support base 87, and it is possible to support the first case 28 and the second case 29 in a predetermined attitude, by adjusting the connection portions between a plurality of support leg bodies 82, 84, and 86 and the support base 87. It is possible to easily improve the assembly workability for assembling the first case 28 and the second case 29 in the diesel engine 1.

As shown in FIGS. 1 to 8, the DPF inlet pipe 34 of the first case 28 is arranged in the side where the exhaust manifold 6 of the diesel engine 1 is installed, the first case 28 is attached so that the exhaust gas in the first case 28 can move in the direction which intersects the axis of the output shaft of the diesel engine 1, and the second case 29 is provided side by side in the lateral side close to the installation side of the cooling fan 24 of the diesel engine 1 in the lateral side of the first case 28. Therefore, the first case 28 and the second case 29 can be compactly arranged in a close contact manner in the upper surface side of the diesel engine 1. On the contrary, it is possible to reduce the temperature reduction of the first case 28 due to the wind of the cooling fan 24 by interposing the second case 29 between the cooling fan 24 and the first case 28. Further, the second case 29 is interposed between the cooling fan 24 and the urea mixing pipe 39 by supporting the urea mixing pipe 39 supplying the exhaust gas to the second case 29 from the first case 28 between the first case 28 and the second case 29, so that it is possible to reduce the temperature reduction of the urea mixing pipe 39 due to the wind of the cooling fan 24.

As shown in FIGS. 1 to 8, FIG. 13 and FIG. 14, in the working vehicle in which the operation cabin 57 is arranged in a rear side of the hood 56 inwardly provided with the diesel engine 1, the urea water tank 71 for the exhaust gas purification is installed between the front portion of the operation cabin 57 and the rear portion of the diesel engine 1. Therefore, it is possible to heat up the urea water tank 71 on the basis of an exhaust heat of the diesel engine 1, it is possible to maintain the temperature of the urea water solution within the urea water tank 71 at a predetermined temperature or higher, and it is possible to prevent the exhaust gas purification capacity of the second case 29 from being lowered in the cold district. The water supply port 72 of the urea water tank 71 can be arranged at a portion where the operator gets on and off in the operation cabin 57 in a close contact manner, it is possible to easily execute a water supply work for supplying the urea water solution to the urea water tank 71 at the place where the operator gets on and off, and it is possible to improve a supply workability of the urea water solution for the exhaust gas purification.

As shown in FIGS. 1 to 12 and FIG. 17, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the engine device is provided with a plurality of case fixing bodies 95 and 96 which firmly fix the first case 28 and the second case 29, and the support frame body 98 which firmly fixes a plurality of case fixing bodies 95 and 96, the case fixing bodies 95 and 96 and the support frame body 98 are connected so that the attachment angle (the attachment position) can be adjusted, and the attitude of the exhaust gas inlet portion 34 of the first case 28 is adapted to be adjustable in relation to the attachment surface of the diesel engine 1. As a result, it is possible to easily join the connection surface of the DPF inlet pipe 34 serving as the exhaust gas inlet portion of the first case 28 to the exhaust gas outlet surface 7a of the diesel engine 1 by adjusting the attachment angle (the attachment position) between the case fixing bodies 95 and 96 and the support frame body 98, when the first case 28 and the second case 29 are united and assembled in the diesel engine 1. It is possible to simplify a work for determining the attachment positions of the first case 28 and the second case 29. More specifically, it is possible to improve the attachment and detachment workability of the first case 28 and the second case 29, and it is possible to simplify the assembling work or the maintenance work of the diesel engine 1.

As shown in FIGS. 1 to 12, the exhaust gas purification device 27 serving as the exhaust gas purification unit is formed by the cases 28 and 29, the case fixing bodies 95 and 96, and the support frame body 98, the lower end sides of a plurality of support leg bodies 82, 84, and 86 are firmly fixed to the outer surfaces of the cylinder head 2 of the diesel engine 1, and the support frame body 98 is connected to the upper end sides of a plurality of support leg bodies 82, 84, and 86. Therefore, it is possible to easily execute the maintenance work in the upper surface side of the diesel engine 1 by attaching and detaching the exhaust gas purification device 27. It is possible to easily reduce the interference with the attached parts of the diesel engine 1 while it is possible to firmly connect the support frame body 98 to the cylinder head 2 via a plurality of support leg bodies 82, 84, and 86, and it is possible to support the exhaust gas purification device 27 to the upper surface side of the diesel engine 1 with a high rigidity.

As shown in FIGS. 1 to 12, the support base 87 is arranged approximately horizontally in the upper surface side of the diesel engine 1 via a plurality of support leg bodies 82, 84, and 86, and the support frame body 98 is firmly fixed to the upper surface side of the support base 87. Therefore, it is possible to easily detach the first case 28 and the second case 29 from the diesel engine 1 in the maintenance work or the repair work of the diesel engine 1, and it is possible to simplify the maintenance work in the upper surface side of the diesel engine 1.

As shown in FIGS. 1 to 12 and FIG. 15, the support base 87 is adapted to be fixed to the diesel engine 1 in a horizontal attitude on the basis of the exhaust gas outlet surface 7a of the diesel engine 1, by bringing a part of the lower surface side of the support base 87 into surface contact with a part of the exhaust gas outlet surface 7a of the diesel engine 1. Therefore, it is possible to construct the support base 87 having the high rigidity structure with a low cost according to a sheet metal processing, it is possible to easily simplify the positioning work when the support frame body 98 is assembled in the upper surface side of the support base 87, and it is possible to easily connect the support base 87 to the diesel engine 1 in a predetermined support attitude.

Next, the differential pressure sensor 111 is provided for detecting difference between an exhaust gas pressure in an exhaust gas intake side (an upstream side) of the soot filter 31, and an exhaust gas pressure in an exhaust gas discharge side (a downstream side) thereof, in the first case 28 as shown in FIGS. 1, 2, and 5. One end side of the sensor bracket 112 is fastened by bolts to the SCR inlet side flange body 40, the other end side of the sensor bracket 112 is protruded toward the upper surface side of the first case 28 from the SCR inlet side flange body 40, and the differential pressure sensor 111 is firmly fixed to the other end side of the sensor bracket 112. The differential pressure sensor 111 is arranged in the upper lateral side of the first case 28 via the sensor bracket 112. An upstream side sensor piping 113 and a downstream side sensor piping 114 made of synthetic resin are connected their one end sides to the differential pressure sensor 111. The upstream side and downstream side sensor pipings 113 and 114 are connected their other end sides respectively to the upstream side and the downstream side of the soot filter 31 in the first case 28.

Further, an upstream side gas temperature sensor 115 is provided for detecting the exhaust gas temperature in the exhaust gas intake side of the diesel oxidation catalyst 30, and a downstream side gas temperature sensor 116 is provided for detecting the exhaust gas temperature in the exhaust gas discharge side of the diesel oxidation catalyst 30. The difference between the exhaust gas pressure in the inflow side of the soot filter 31 and the exhaust gas pressure in the outflow side of the soot filter 31 (the differential pressure of the exhaust gas) is detected by the differential pressure sensor 111, and the exhaust gas temperature of the diesel oxidation catalyst 30 portion in the exhaust gas intake side of the soot filter 31 is detected by the temperature sensors 115 and 116. More specifically, since the residual volume of the particulate matter in the exhaust gas collected by the soot filter 31 is in proportion to the differential pressure of the exhaust gas, a soot filter regeneration control is executed on the basis of results of detection of the differential pressure sensor 111 when an amount of the particulate matters remaining in the soot filter 31 is increased more than a predetermined amount, the soot filter regeneration control reducing the amount of the particulate matters in the soot filter 31 (for example, a fuel injection control or an intake air control of the diesel engine 1 for raising the temperature of the exhaust gas).

Figure 18:
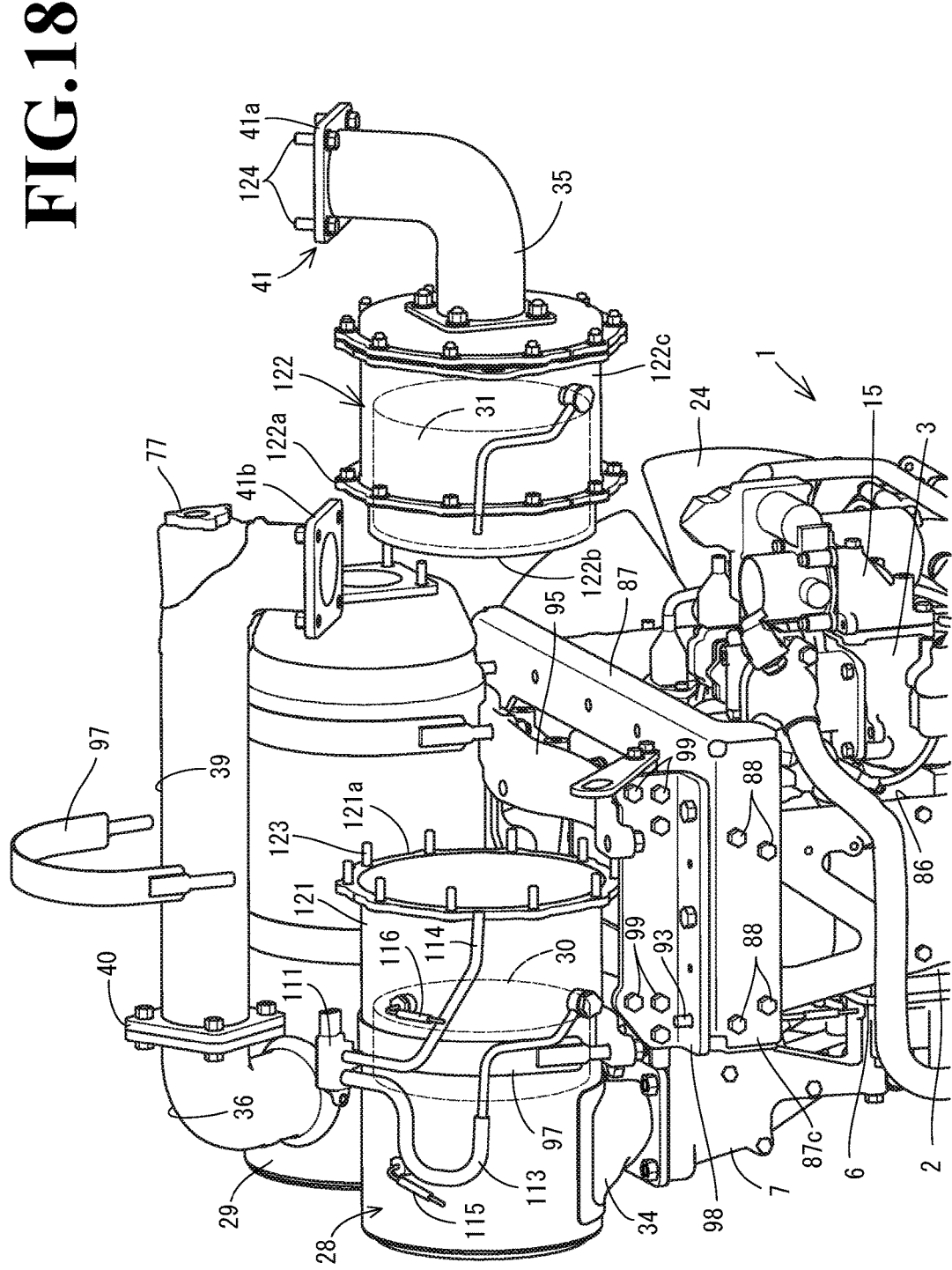
FIG. 18 is a back elevational perspective view in a state in which a first case is partly exploded.
Figure 19:
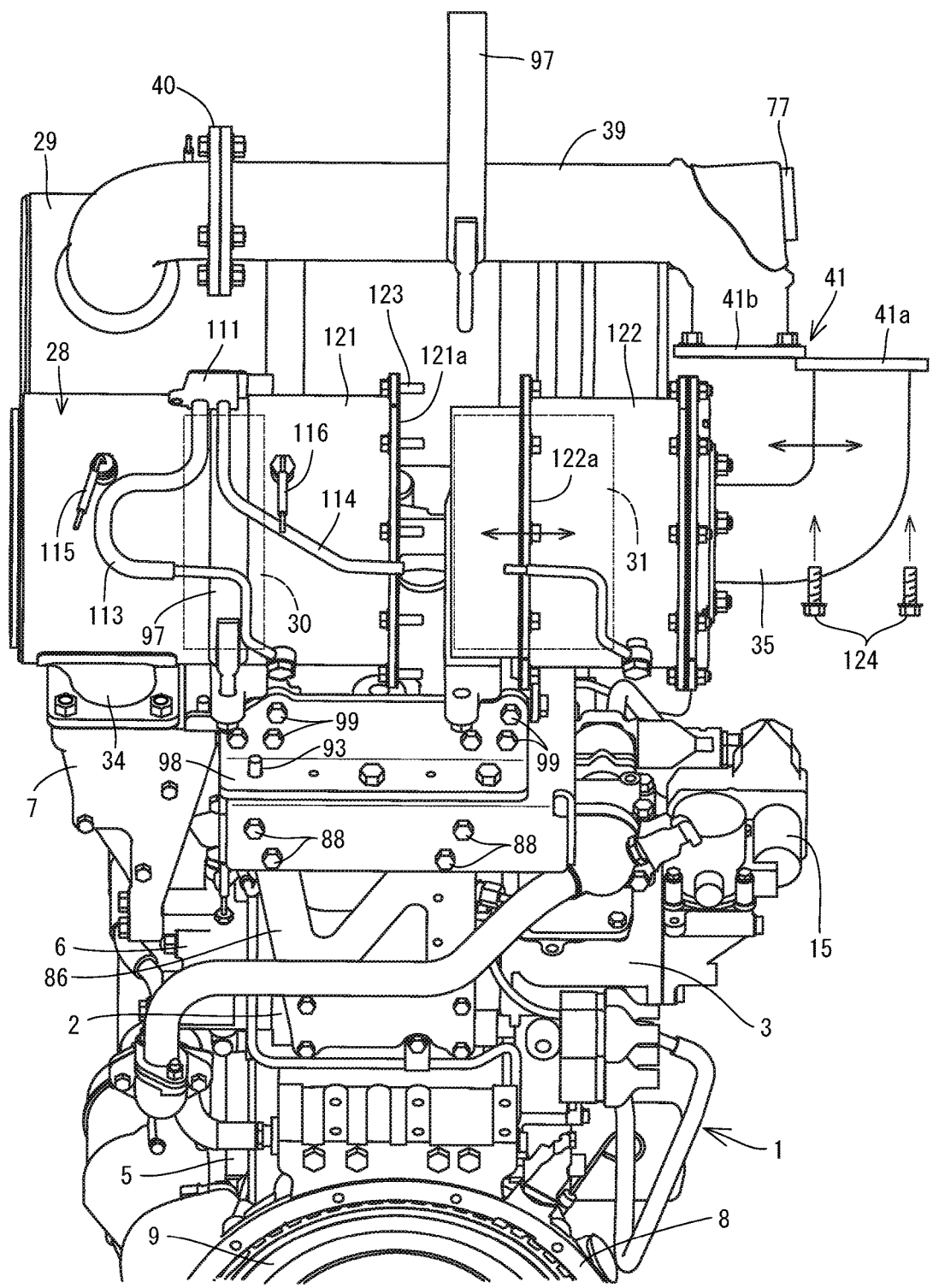
FIG. 19 is an attachment and detachment explanatory view in a state in which the first case is partly exploded.

Next, a description will be given of the assembly and disassembly structure of the first case 28 with reference to FIGS. 18 and 19. As shown in FIGS. 18 and 19, the first case 28 is formed by an exhaust gas intake side case 121 which is provided with the DPF inlet pipe 34, and an exhaust gas discharge side case 122 which is provided with the DPF outlet pipe 35. The oxidation catalyst 30 is inwardly provided in the exhaust gas intake side case 121, the soot filter 31 is inwardly provided in an inner tube 122b of the exhaust gas discharge side case 122, an exhaust gas intake side of the inner tube 122b is inwardly provided in an outer tube 122c of the exhaust gas discharge side case 122, and an exhaust gas discharge side of the inner tube 122b is adapted to be protruded out of the outer tube 122c.

Further, the exhaust gas discharge side of the inner tube 122b is inserted into the exhaust gas intake side case 121 so as to be freely taken in and out, a case flange body 121a of the exhaust gas intake side case 121 is fastened by bolts 123 to a case flange body 122a of the outer tube 122c so as to be separable, and the exhaust gas intake side case 121 and the exhaust gas discharge side case 122 are detachably connected. Meanwhile, the DPF outlet pipe 35 serving as the exhaust gas outlet pipe is provided in the exhaust gas discharge side case 122 (the outer tube 122c), and the exhaust gas outlet side of the DPF outlet pipe 35 is extended in a radial direction (a direction which is orthogonal to the cylinder axis of the first case 28) which intersects the exhaust gas moving direction of the first case 28. Further, the DPF outlet side flange body 41 for connecting the urea mixing pipe 39 and the DPF outlet pipe 35 is formed by an outlet pipe flange 41a in the exhaust gas outlet side end portion of the DPF outlet pipe 35, and a mixing pipe flange 41b in the exhaust gas inlet side end portion of the urea mixing pipe 39, and the outlet pipe flange 41a is positioned in an outer lateral side of a cylindrical outer peripheral surface of the exhaust gas discharge side case 122 (the outer tube 122c).

More specifically, the DPF outlet pipe 35 is extended to the outer side in the direction which intersects the exhaust gas moving direction in the outer side of the exhaust gas discharge side case 122, and the connection portion (the DPF outlet side flange body 41) between the urea mixing pipe 39 and the DPF outlet pipe 35 is arranged at a position which is deflected from the separation track of the exhaust gas discharge side case 122 which is separated in the exhaust gas moving direction. The DPF outlet pipe 35, the urea mixing pipe 39, and the SCR inlet pipe 36 are adapted to be integrally fixed by connecting one end side of the urea mixing pipe 39 to the DPF outlet pipe 35 with fastening the mixing pipe flange 41b by bolts 124 to the outlet pipe flange 41a, and connecting the other end side of the urea mixing pipe 39 to the SCR inlet pipe 36 via the SCR inlet side flange body 40.

According to the structure mentioned above, in the case that the residual volume of the particulate matter of the soot filter 31 (a detected value of the differential pressure sensor 111) is increased more than a regeneration controllable range, the fastening between the case flange bodies 121a and 122a is released by detaching the bolts 123, and the exhaust gas discharge side case 122 can be separated from the exhaust gas intake side case 121 when releasing the fastening between the outlet pipe flange 41a and the mixing pipe flange 41b. The first case 28 is detachably disassembled by moving the exhaust gas discharge side case 122 from the exhaust gas intake side case 121 in the direction of the cylindrical axis of the first case 28 (the exhaust gas moving direction), and extracting the inner tube 122b from the exhaust gas intake side case 121. Next, the maintenance work of the first case 28 for artificially removing the particulate matter in the soot filter 31 is carried out by taking the soot filter 31 out of the inner tube 122b.

By the way, the exhaust gas intake side case 121 is supported to the exhaust gas outlet pipe 7 via the DPF inlet pipe 34 when the fastening between the case flange bodies 121a and 122a is released by disconnecting the bolts 123, and the urea mixing pipe 39 is supported to the second case 29 via the SCR inlet side flange body 40 when the fastening between the outlet pipe flange 41a and the mixing pipe flange 41b is released by disconnecting the bolts 124. Therefore, since only the exhaust gas discharge side case 122 is detached and it is not necessary to detach the exhaust gas intake side case 121 or the urea mixing pipe 39, in the maintenance (filter regeneration) work of the soot filter 31, it is possible to reduce a maintenance man-hour of the soot filter 31 in comparison with the structure in which it is necessary to disassemble the exhaust gas intake side case 121, the urea mixing pipe 39, or the like.

As shown in FIGS. 1 to 7, FIG. 18, and FIG. 19, in the engine device of the working vehicle having the first case 28 which removes the particulate matter in the exhaust gas of the engine 1, and the second case 29 which removes the nitrogen oxides in the exhaust gas of the engine 1, and connecting the second case 29 to the first case 28 via the urea mixing pipe, the first case 28 is separately formed in the exhaust gas intake side case 121 and the exhaust gas discharge side case 122, and the exhaust gas discharge side case 122 is structured to be separable in a state in which the exhaust gas intake side case 121 is supported to the engine 1 side. Therefore, in the maintenance work of the inner portion of the first case 28, it is not necessary to detach a whole of the first case 28, it is possible to easily reduce the number of the detachable parts necessary for the maintenance work of the inner portion of the exhaust gas discharge side case 122 (the first case), it is possible to easily detach the soot filter 31 and the like which is inwardly provided in the exhaust gas discharge side case 122, and it is possible to reduce a cleaning man-hour of the inner portion of the exhaust gas discharge side case 122 or the soot filter 31.

As shown in FIGS. 1 to 7, FIG. 18, and FIG. 19, the DPF outlet pipe 35 is provided as the exhaust gas outlet pipe which connects the urea mixing pipe 39 to the first case 28, the DPF outlet pipe 35 is extended to an outer side in the direction which intersects the exhaust gas moving direction in the outer side of the exhaust gas discharge side case 122, and the connection portion (the DPF outlet side flange body 41) between the urea mixing pipe 39 and the DPF outlet pipe 35 is arranged at a position which is deflected from the separation track of the exhaust gas discharge side case 122 separated in the exhaust gas moving direction. Therefore, the exhaust gas discharge side case 122 can be easily slid and disconnected in the exhaust gas moving direction of the first case 28 by disconnecting the fastening bolts in the connection portion between the urea mixing pipe 39 and the DPF outlet pipe 35, and releasing the connection between the exhaust gas intake side case 121 and the exhaust gas discharge side case 122.

As shown in FIGS. 1 to 7, FIG. 18, and FIG. 19, the exhaust gas purification device 27 serving as the exhaust gas purification unit is adapted to be formed by disposing the case fixing bodies 95 and 96 and the fastening bands 97 as the pinching body which firmly fixes the exhaust gas intake side case 121 and the second case 29, disposing the case fixing bodies 95 and 96 and the fastening bands 97 as the pinching body which firmly fixes the exhaust gas discharge side case 122 and the second case 29, and firmly and integrally fixing the first case 28 and the second case 29 by the case fixing bodies 95 and 96 and the fastening bands 97. Therefore, it is possible to easily attach and detach the exhaust gas discharge side case 122 by disconnecting the fastening bands 97 which firmly fix the exhaust gas discharge side case 122 and the second case 29. It is not necessary to carry out the attaching and detaching work of the fastening bands 97 which firmly fix the exhaust gas intake case 121 and the second case 29 when maintaining the inner portion of the exhaust gas discharge side case 122, and it is possible to improve a workability of maintaining the inner portion of the exhaust gas discharge side case 122 (cleaning the soot filter).

As shown in FIG. 1 and FIGS. 9 to 12, the support base 87 is adapted to be connected to the exhaust manifold 6 of the diesel engine 1 and a plurality of support leg bodies 82, 84, and 86 by disposing the case fixing bodies 95 and 96 and the fastening bands 97 which firmly and integrally fix the first case 28 and the second case 29, and the support base 87 which attaches the case fixing bodies 95 and 96, and arranging a plurality of support leg bodies 82, 84, and 86 in a rising manner in the upper surface side of the diesel engine 1. Therefore, it is possible to absorb a working error or the like of the attachment part such as the support base 87 and the like by adjusting the connection portions between the support leg bodies 82, 84, and 86 and the support base 87, it is possible to easily compensate the angle of incline for the attachment of the support base 87, it is possible to easily support the first case 28 and the second case 29 in a predetermined attitude, and it is possible to support the support base 87 so as to be separated from the attached parts of the diesel engine 1, thereby preventing the mutual interference. It is possible to easily improve the assembly workability for assembling the first case 28 and the second case 29 in the diesel engine 1.

Figure 20:
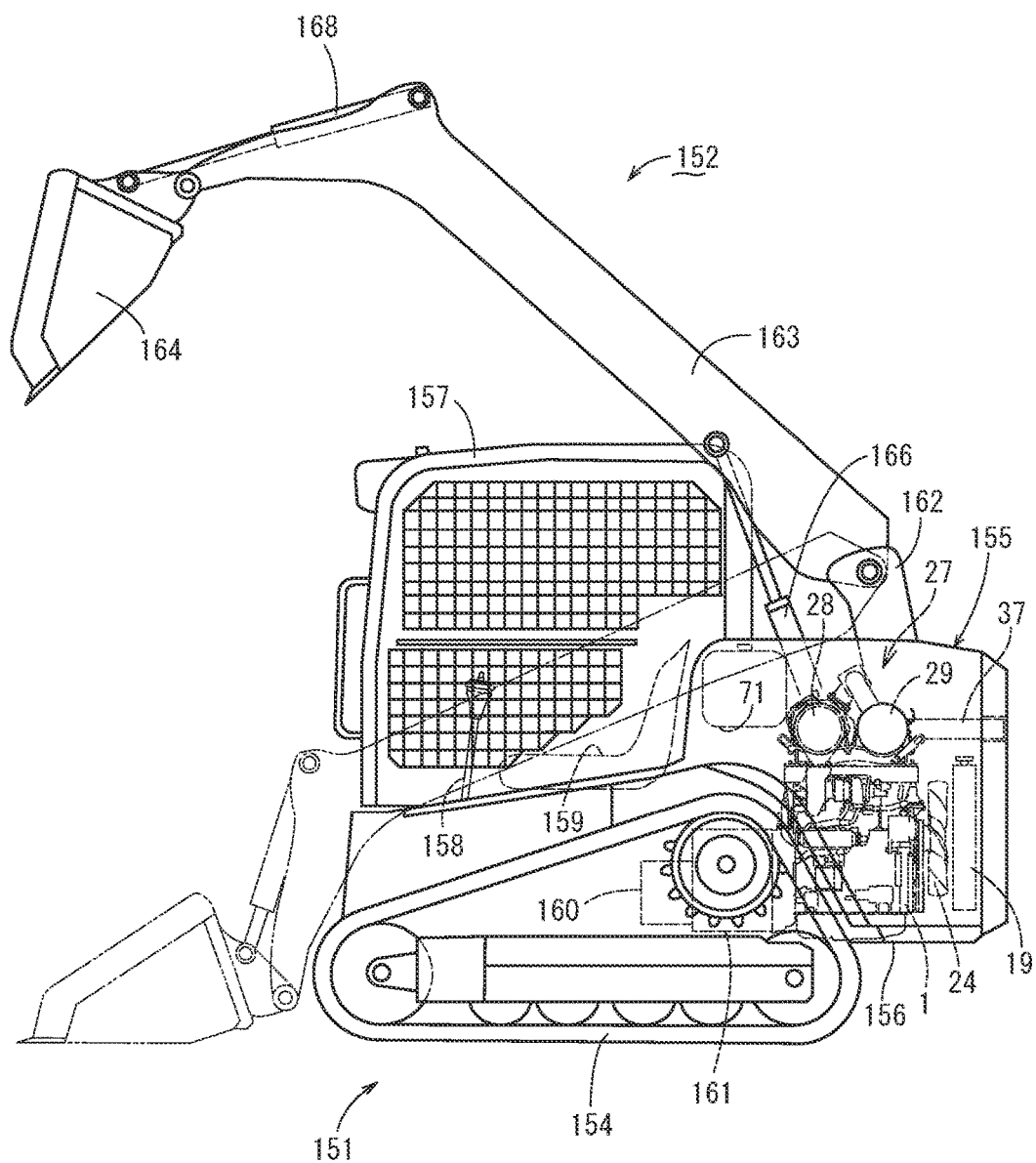
FIG. 20 is a side elevational view of a working vehicle which mounts a diesel engine thereon.
Figure 21:
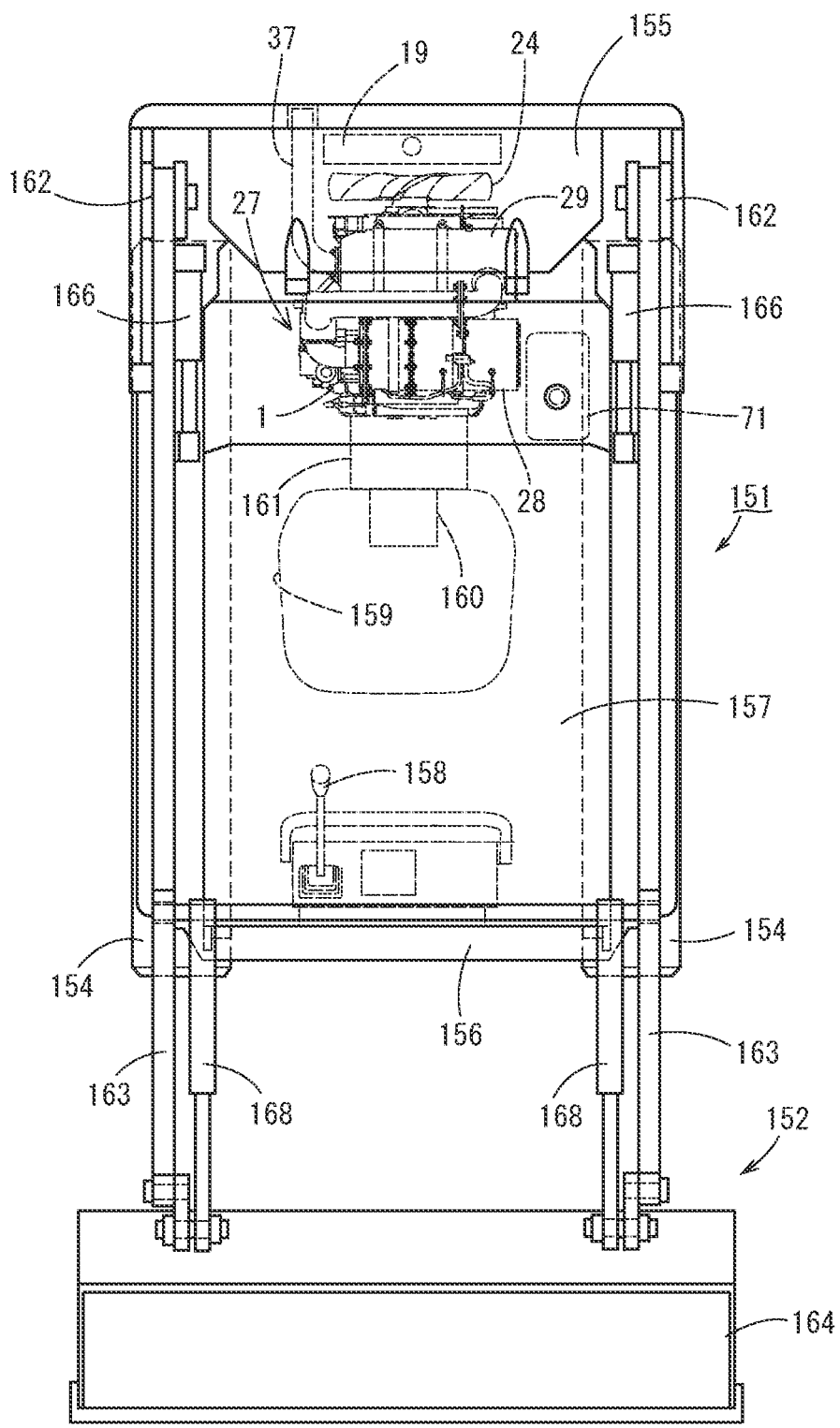
FIG. 21 is a plan view of the working vehicle.
Figure 22:
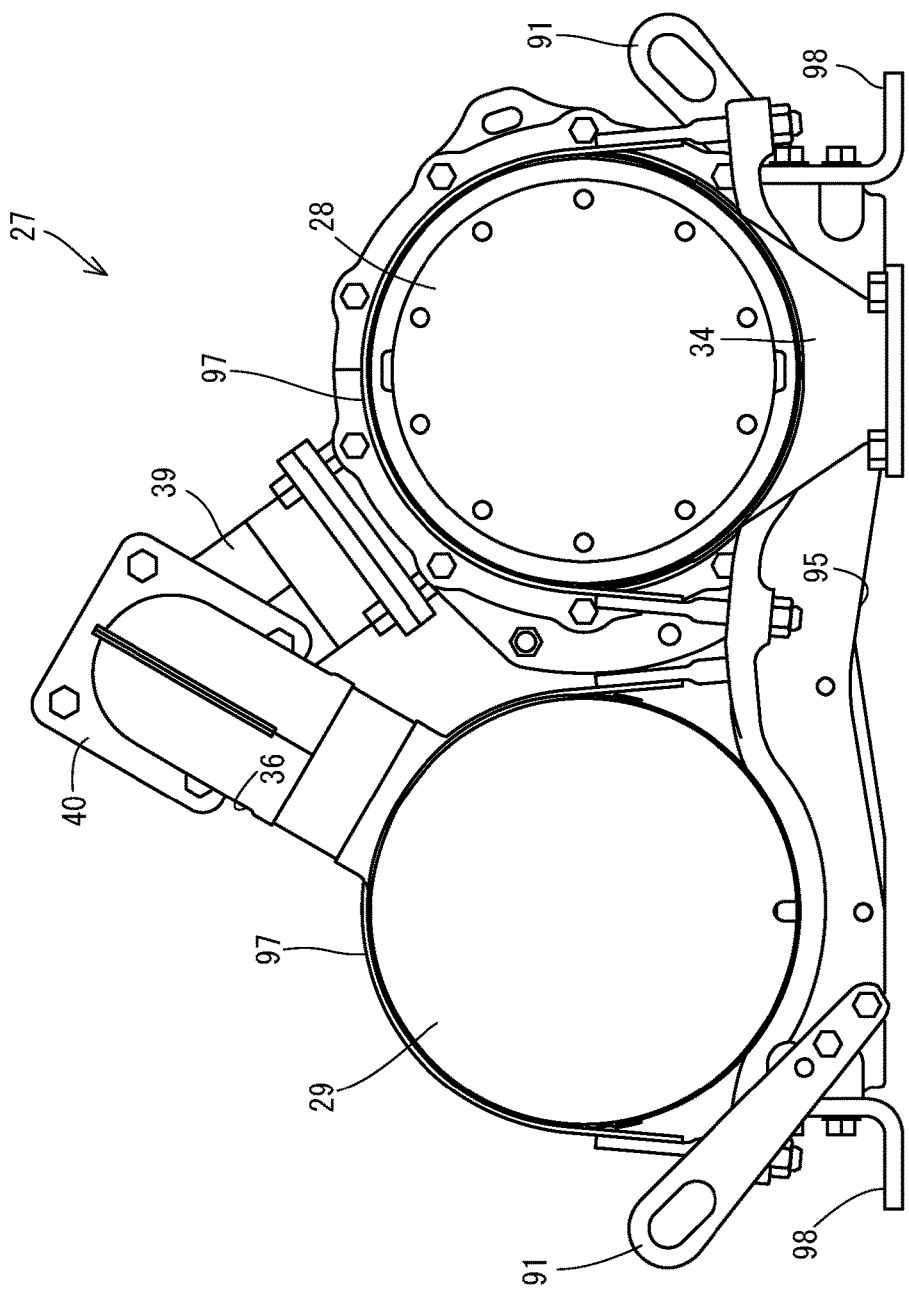
FIG. 22 is a front elevational view of an exhaust gas purification unit body.
Figure 23:
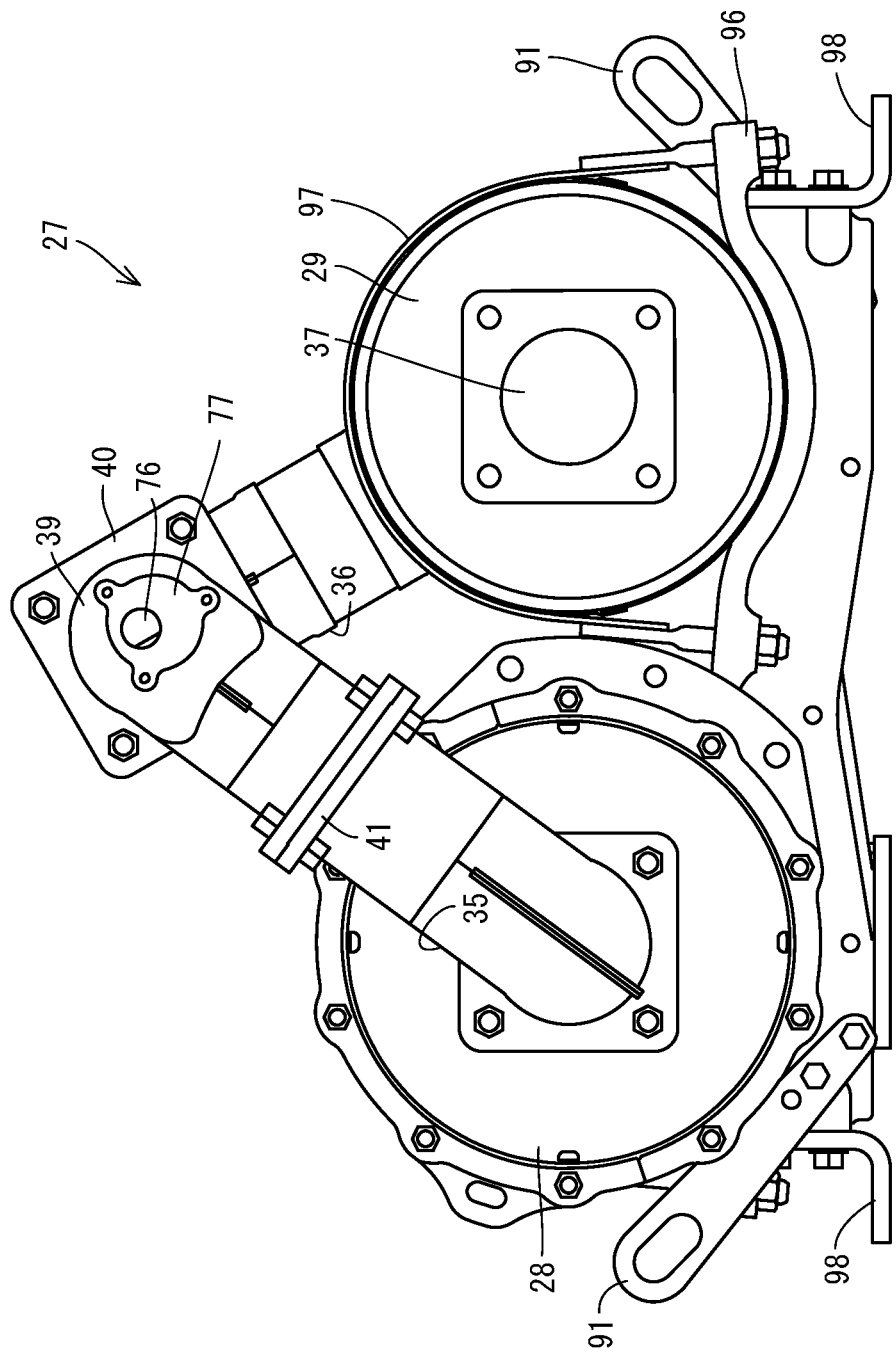
FIG. 23 is a back elevational view of the same.
Figure 24:
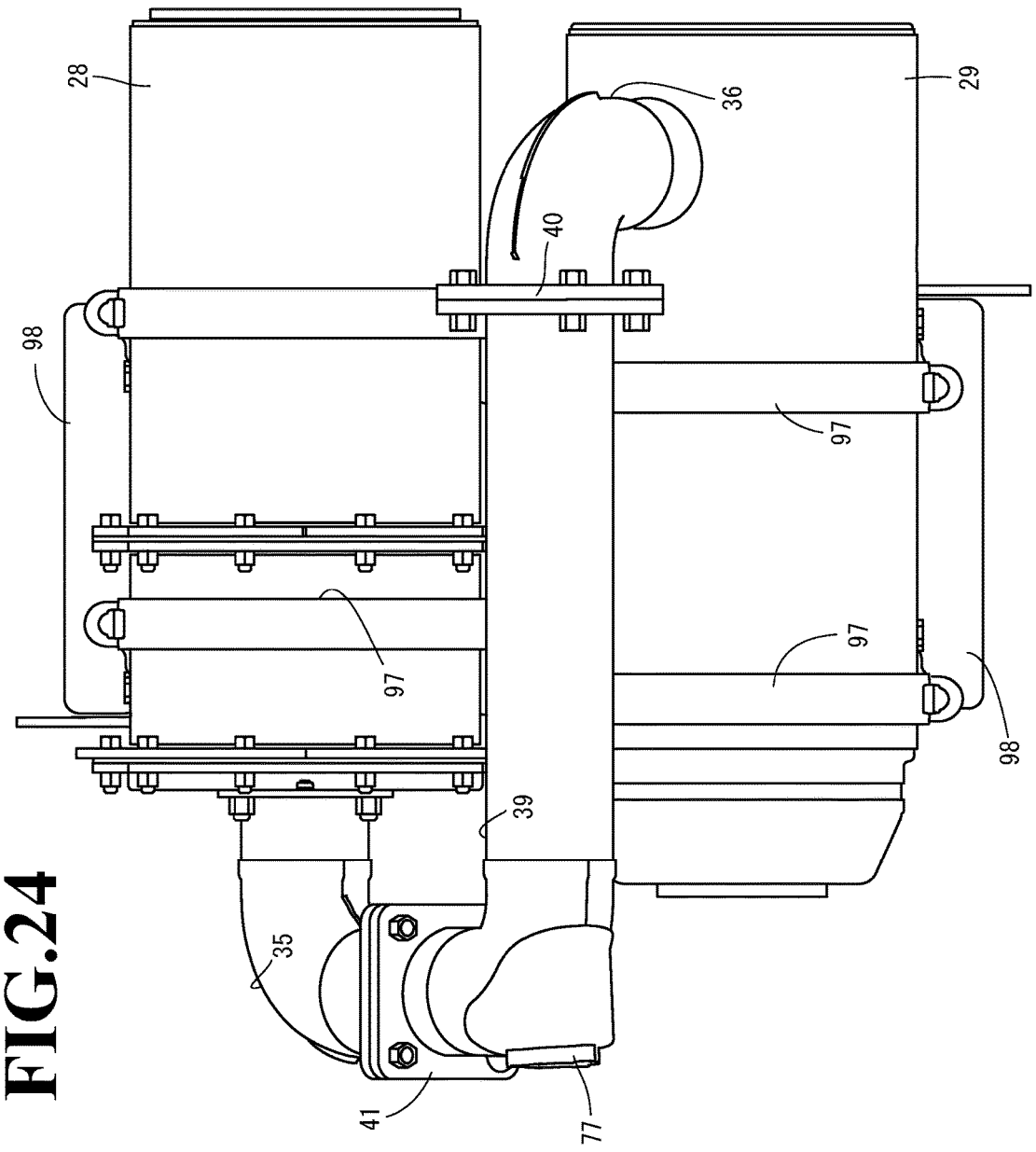
FIG. 24 is a left side elevational view of the same.
Figure 25:
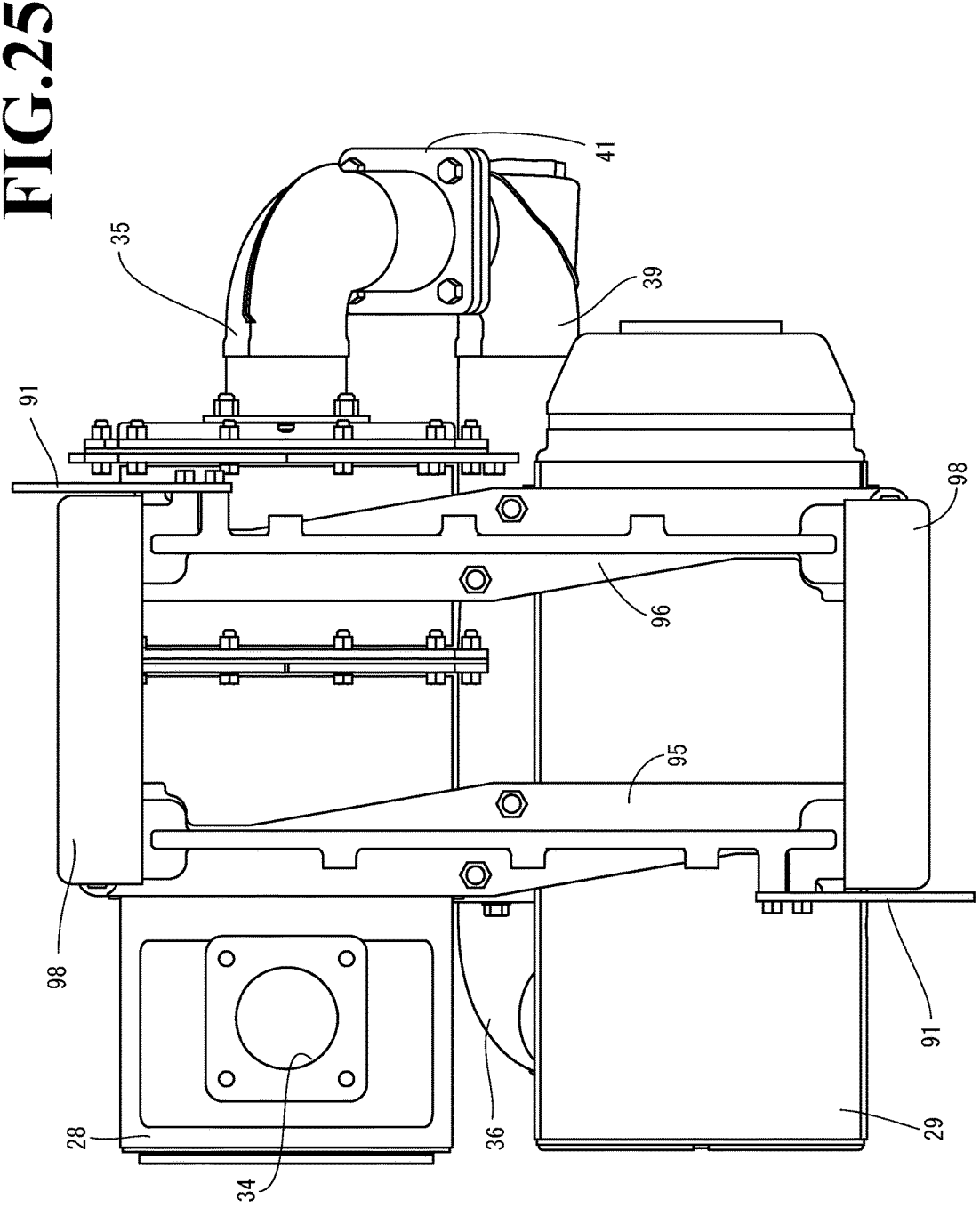
FIG. 25 is a right side elevational view of the same.
Figure 26:
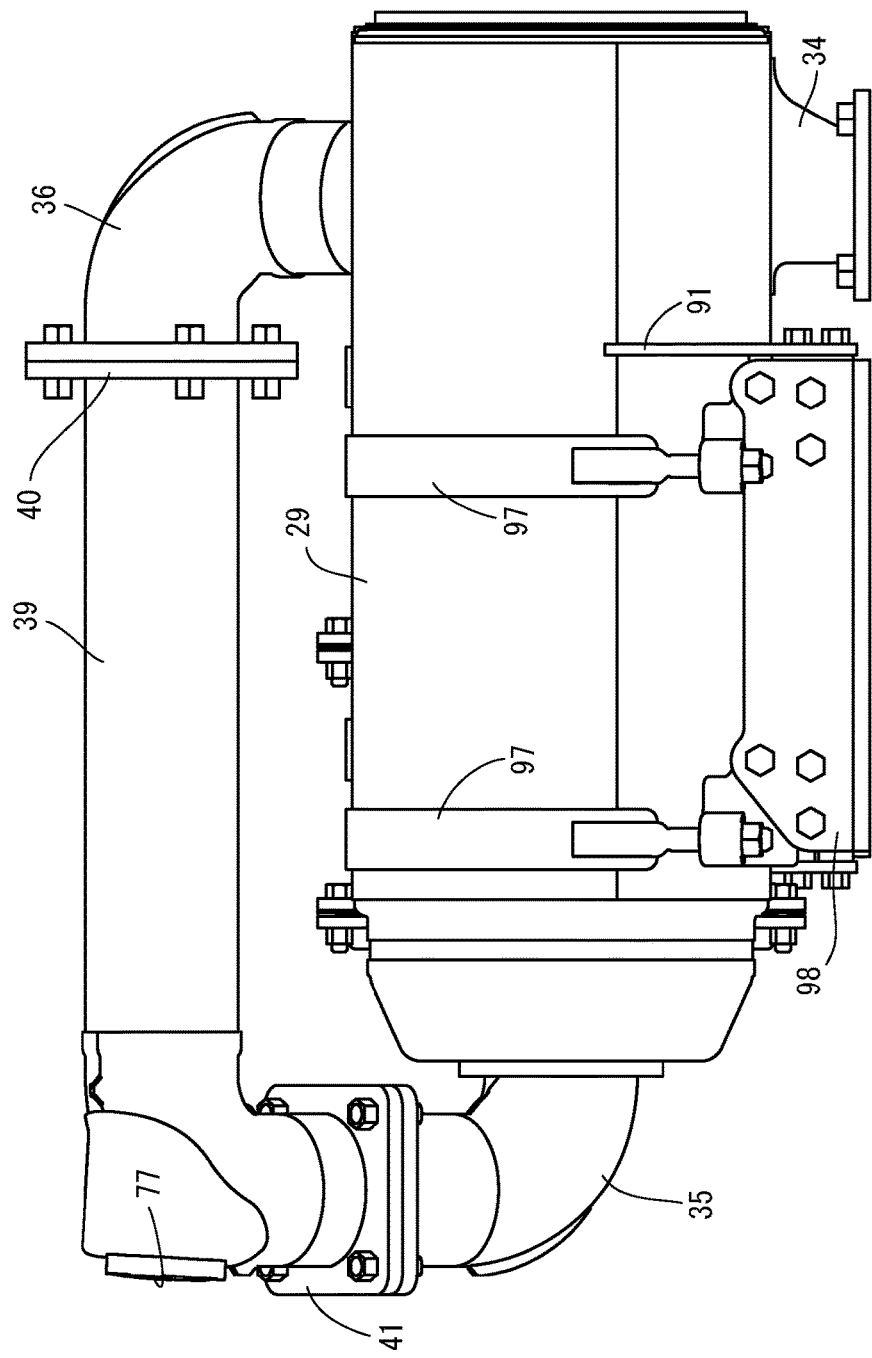
FIG. 26 is a plan view of the same.
Figure 27:
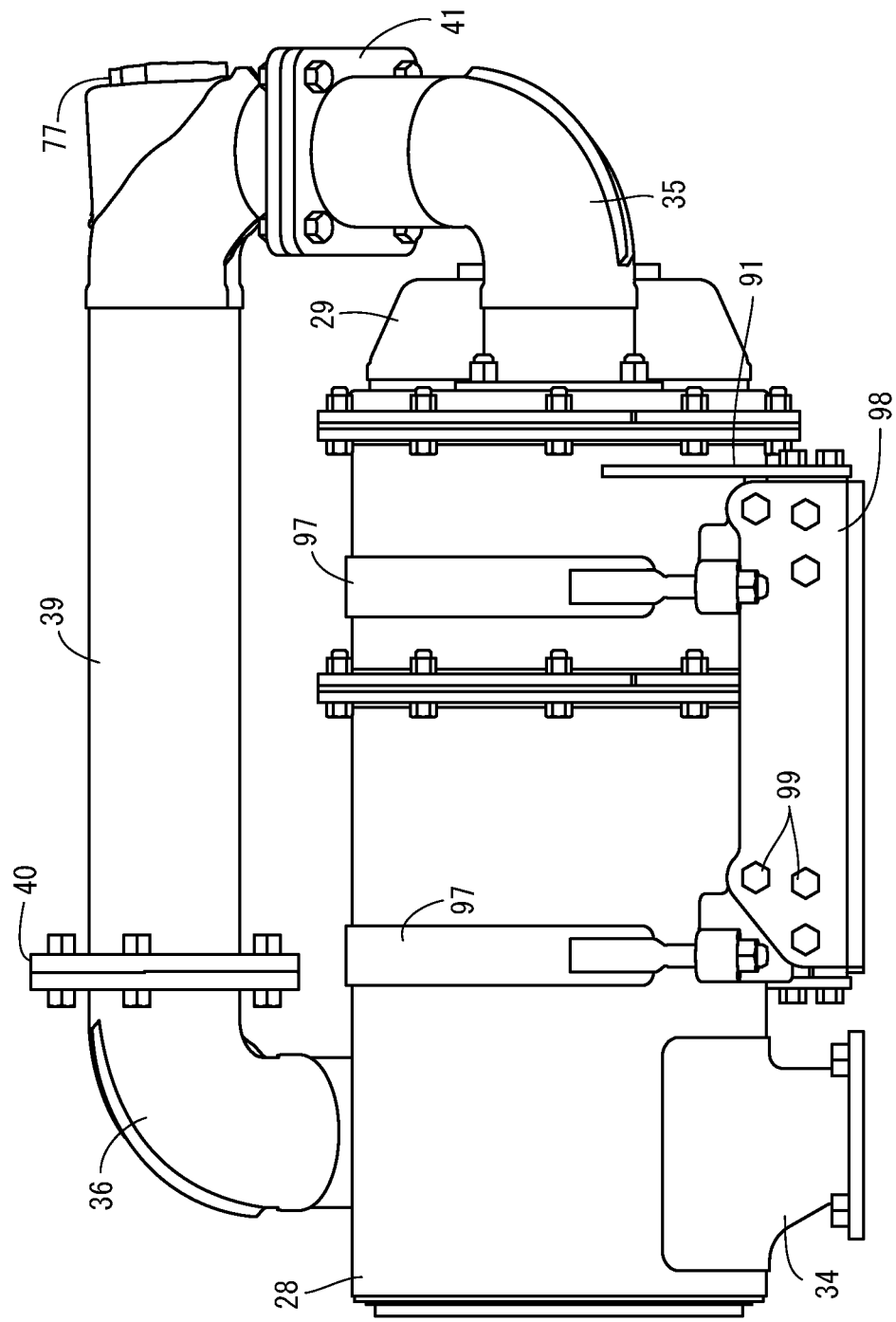
FIG. 27 is a bottom elevational view of the same.

Next, a description will be given of a skid steer loader 151 which mounts the diesel engine 1 thereon, with reference to FIGS. 20 and 21. The skid steer loader 151 shown in FIGS. 20 and 21 and serving as the working vehicle installs a loader device 152 mentioned later thereto and is adapted to carry out a loading work. In the following description, a left side in a direction toward a forward moving direction of the skid steer loader 151 is simply called as a left side, and a right side in a direction toward the forward moving direction is simply called as a right side in the same manner. Right and left travel crawler portions 154 are installed to the skid steer loader 151. Further, an openable hood 155 is arranged above the travel crawler portions 154 of the skid steer loader 151. The diesel engine 1 is accommodated within the hood 155. The first case 28 and the second case 29 are mounted on and fixed to the upper surface portion of the diesel engine 1.

The diesel engine 1 is supported to a travel machine body 156 provided in the skid steer loader 151 via a vibration isolation member or the like. A cabin 157 for a driver to get on is arranged in front of the hood 155, and a control steering wheel 158, a driver seat 159, and the like are provided in an inner portion of the cabin 157. Further, there are provided a loading work hydraulic pump device 160 which is driven by the diesel engine 1, and a travel transmission device 161 which drives the right and left travel crawler portion 154. The power from the diesel engine 1 is transmitted to the right and left travel crawler portions 154 via the travel transmission device 161. An operator seating on the driver seat 159 can carry out a traveling operation and the like of the skid steer loader 151 via a control portion such as the control steering wheel 158.

Further, the loader device 152 has loader posts 162 which are arranged both right and left sides of the travel machine body 156, a pair of right and left lift arms 163 which are connected to upper ends of the loader posts 162 so as to be freely oscillated up and down, and a bucket 164 which is connected to leading end portions of the right and left lift arms 163 so as to be freely oscillated up and down.

Lift cylinders 166 for oscillating up and down the lift arms 163 are respectively provided between the loader post 162 and the corresponding lift arms 163. Bucket cylinders 168 for oscillating up and down the bucket 164 are provided between the right and left lift arms 163 and the bucket 164. In this case, a hydraulic force of the loading work hydraulic pump device 160 is controlled according to an operation of a loader lever (not shown) by the operator on the control seat 159, the lift cylinders 166 and the bucket cylinders 168 are actuated to be expanded and contracted to oscillate up and down the lift arms 163 and the bucket 164, and the loading work is adapted to be executed. The urea water tank 71 is inwardly provided in a front side upper portion of the hood 155. Further, the radiator 19 arranged so as to be opposed to the cooling fan 24 is inwardly provided in a rear portion of the hood 155.

As shown in FIGS. 1 to 12, FIGS. 15 to 19, and FIGS. 22 to 27, in the engine device having the first case 28 which removes the particulate matters in the exhaust gas of the diesel engine 1, and the second case 29 which removes the nitrogen oxides in the exhaust gas of the diesel engine 1, and structured such that the second case 29 is connected to the first case 28 via the urea mixing pipe 39, the engine device is provided with a plurality of support leg bodies 82, 84, and 86 in the front portion, the side portion, and the rear portion which are connected their one end sides to the diesel engine 1, and the support base 87 which is connected to the plurality of support leg bodies 82, 84, and 86, and the first case 28 and the second case 29 are arranged in the support base 87. As a result, since the support structure for the first case 28 and the second case 29 can be constructed by being separated into the support portion (the support base 87) for the first case 28 and the second case 29, and the support post portions (the support leg bodies 82, 84, and 86 in the front portion, the side portion, and the rear portion) supporting the support portion (the support base 87), a cooling air passage can be secured between the support leg bodies 82, 84, and 86 in the front portion, the side portion, and the rear portion, it is possible to reduce interference between the attached part of the diesel engine 1 and the first case 28 or the second case 29 while it is possible to well maintain a ventilation performance in the outer peripheral portion of the diesel engine 1, it is possible to improve an assembly workability of the diesel engine 1, and it is possible to improve a maintenance workability of the diesel engine 1.

As shown in FIGS. 1 to 12 and FIGS. 15 to 19, the support frame body 98 is provided for firmly fixing the first case 28 and the second case 29, the support base 87 is firmly and approximately horizontally fixed to the upper surface side of the diesel engine 1 via a plurality of support leg bodies 82, 84, and 86, the support frame body 98 is firmly fixed to the upper surface side of the support base 87, the cylindrical first case 28 and the second case 29 are arranged in the upper surface side of the support base 87 via the support frame body 98 in the sideways falling attitude, and the urea mixing pipe 39 is arranged in parallel between the first case 28 and the second case 29 which are arranged side by side, in their upper face sides. As a result, the first case 28 and the second case 29 can be integrally assembled and disassembled by connecting and disconnecting the support base 87 and the support frame body 98, and the first case 28 and the second case 29 can be compactly supported at a low level to the upper surface side of the diesel engine 1. Further, it is possible to maintain an attachment interval between the first case 28 and the second case 29 constant via the support frame body 98 with a simple assembling work, and it is possible to simplify an exhaust gas piping structure such as the urea mixing pipe 39 between the cases 28 and 29.

As shown in FIGS. 7 to 12 and FIGS. 15 to 17, the vent hole 87a is formed in the support base 87 in the lower surface side of the first case 28 or the second case 29, the air passage 94 is formed between the diesel engine 1 and each of the cases by the portions between the support leg bodies 82, 84, and 86 in the front portion, the side portion, and the rear portion, and the vent hole 87a. As a result, it is possible to easily suppress temperature rise in the outer peripheral portion of the diesel engine 1 facing to the first case 28 or the second case 29, and it is possible to improve durability of the attached part in the upper surface side of the diesel engine 1.

As shown in FIGS. 1 to 12 and FIGS. 22 to 27, the exhaust gas purification device 27 serving as the exhaust gas purification unit is formed by firmly and integrally fixing the first case 28 and the second case 29 by the support frame body 98, and the exhaust gas purification device 27 is detachably supported to the support base 87. As a result, each of the cases 28 and 29 can be easily assembled in the diesel engine 1 by an assembly process near an end of the assembly process of the diesel engine 1, and it is possible to easily detach the exhaust gas purification device 27 from the diesel engine 1 with a maintenance work or a repair work of the diesel engine 1. Further, for example, the diesel engine 1 and the exhaust gas purification device 27 can be packed with a low level by a transport pallet in a separated state and be effectively accommodated with multiple stages in an inner portion of a transport container, the diesel engine 1 and the exhaust gas purification device 27 can be efficiently packed in an internal space of the transport container, and it is possible to reduce a transport cost for conveying the diesel engine 1 or the exhaust gas purification device 27 from a work place (an assembly plant) for assembling the diesel engine 1 or the exhaust gas purification device 27 to a work place (an assembly plant) for mounting the diesel engine 1 or the exhaust gas purification device 27 on the working vehicle (the tractor 51 or the skid steer loader 151).

Next, as shown in FIGS. 11, 12, 15 to 17, 28, and 29, the exhaust gas outlet pipe 7 is also used as the support member of the exhaust gas purification device 27, the exhaust gas purification device 27 is supported to the exhaust gas outlet pipe 7 having the high rigidity, and the exhaust gas purification device 27 is attached to the outer peripheral side (the upper surface side) of the diesel engine 1. A lower end side of the front portion support leg body 82 is fastened by bolts 81 to a corner portion of a left side surface in the front portion of the cylinder head 2 having a rectangular shape in its plan view of the diesel engine 1, a lower end side of the side portion support leg body 84 is fastened by bolts 83 to a corner portion of a right side surface in the front portion of the cylinder head 2, and a lower end side of the rear portion support leg body 86 is fastened by bolts 85 to a back surface in the rear portion of the cylinder head 2.

More specifically, the lower end sides of the front portion support leg body 82, the side portion support leg body 84, and the rear portion support leg body 86 are respectively fastened to three directions including the left side surface and the right side surface of the front portion of the cylinder head 2 having the rectangular shape in its plan view of the diesel engine 1, and the back surface of the rear portion of the cylinder head 2, the upper end sides of a plurality of support leg bodies (the front portion support leg body 82, the side portion support leg body 84, and the rear portion support leg body 86) are connected to the lower surface side of the support base 87 having the rectangular shape in its plan view, the support base 87 is arranged in the upper surface side of the diesel engine 1 via each of the support leg bodies 82, 84, and 86, the support frame body 98 is firmly and detachably fixed to the approximately horizontal upper surface side of the support base 87, and the exhaust gas purification device 27 is mounted to the upper surface of the support base 87.

Figure 15:
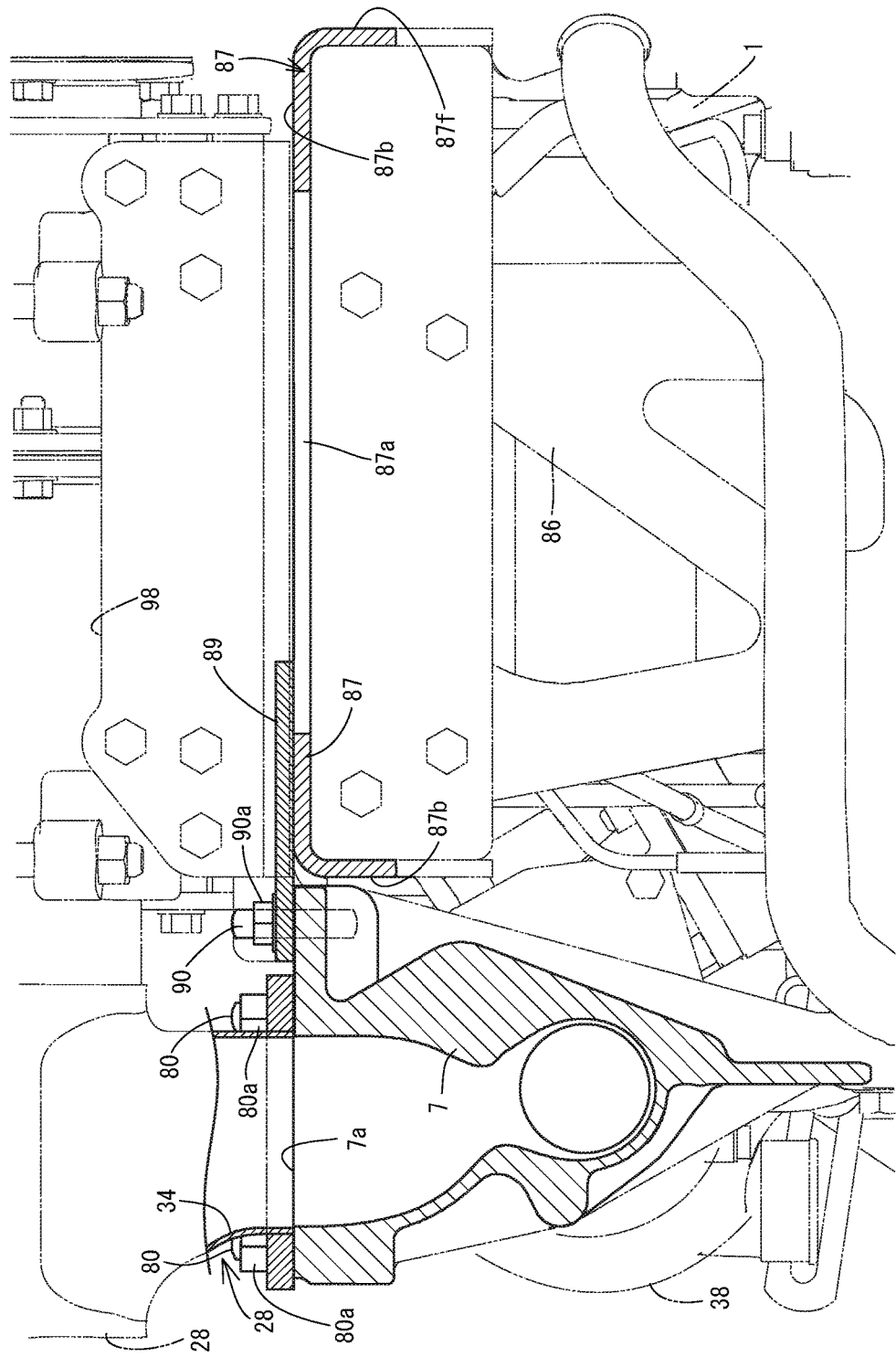
FIG. 15 is a back elevational cross sectional view of a support base portion of an exhaust gas purification unit body.
Figure 16:
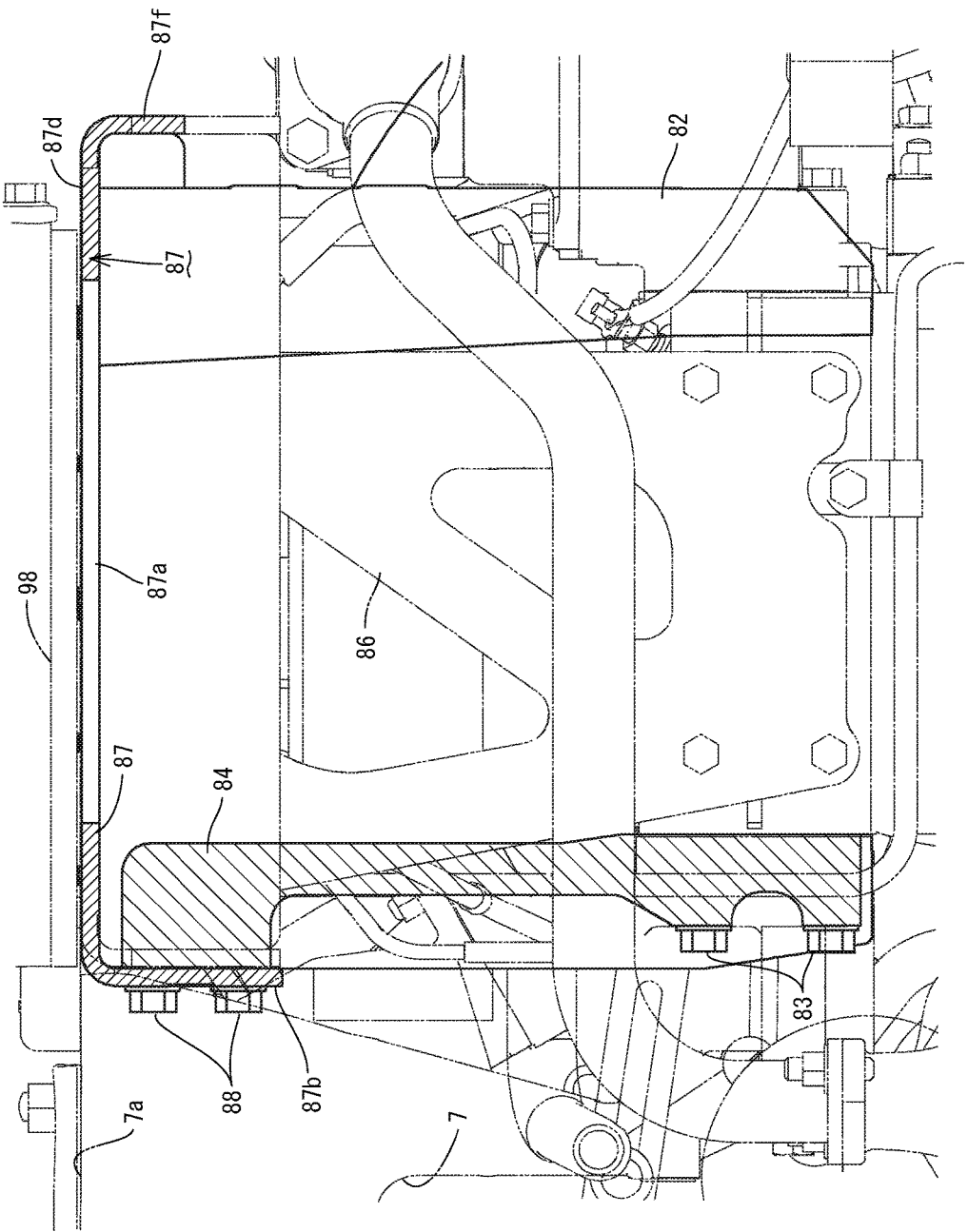
FIG. 16 is a back elevational cross sectional view of a support leg body portion of the same.
Figure 17:
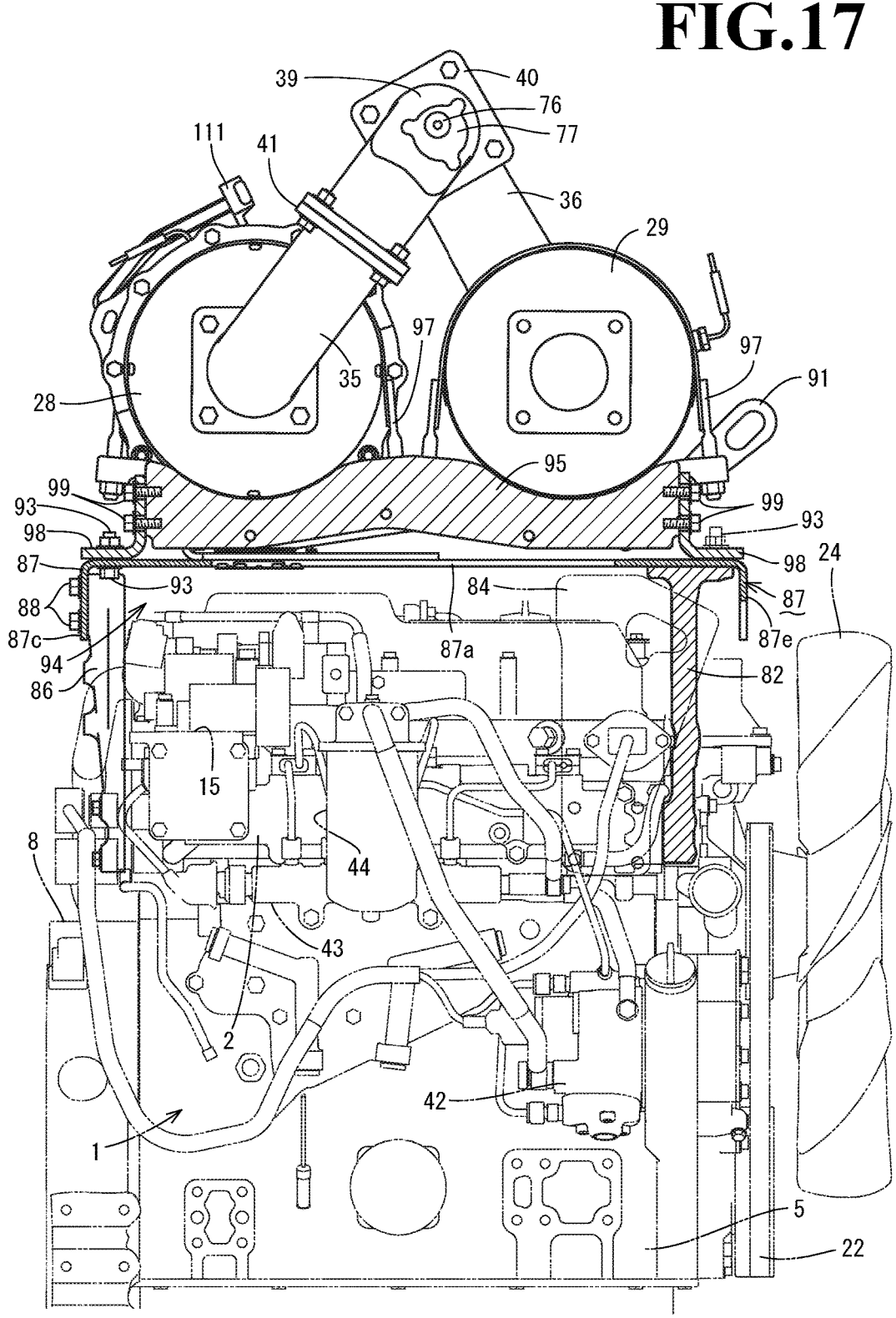
FIG. 17 is a back elevational cross sectional view of a case attachment frame body portion of the same.
Figure 28:
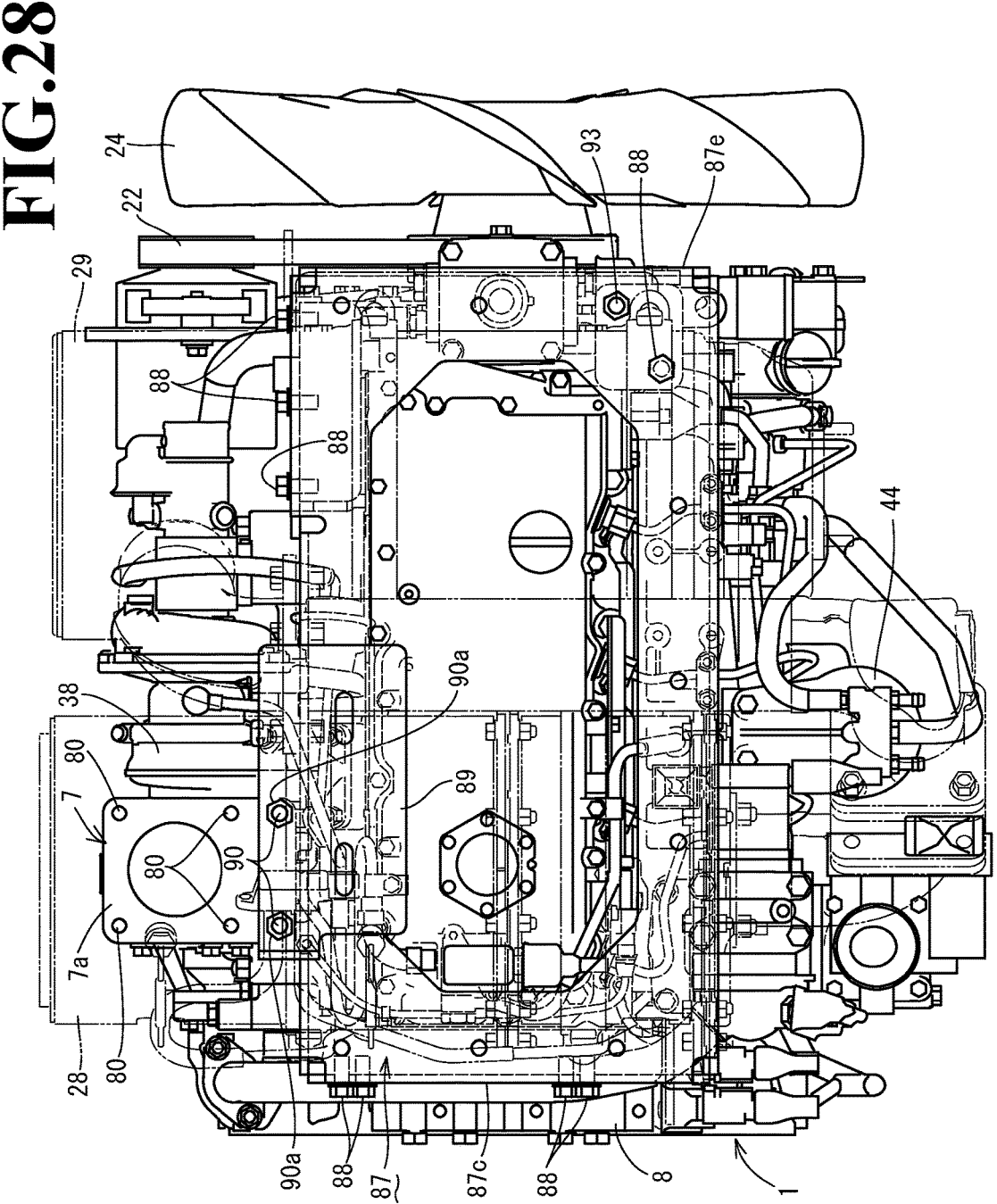
FIG. 28 is a plan view of a support base.
Figure 29:
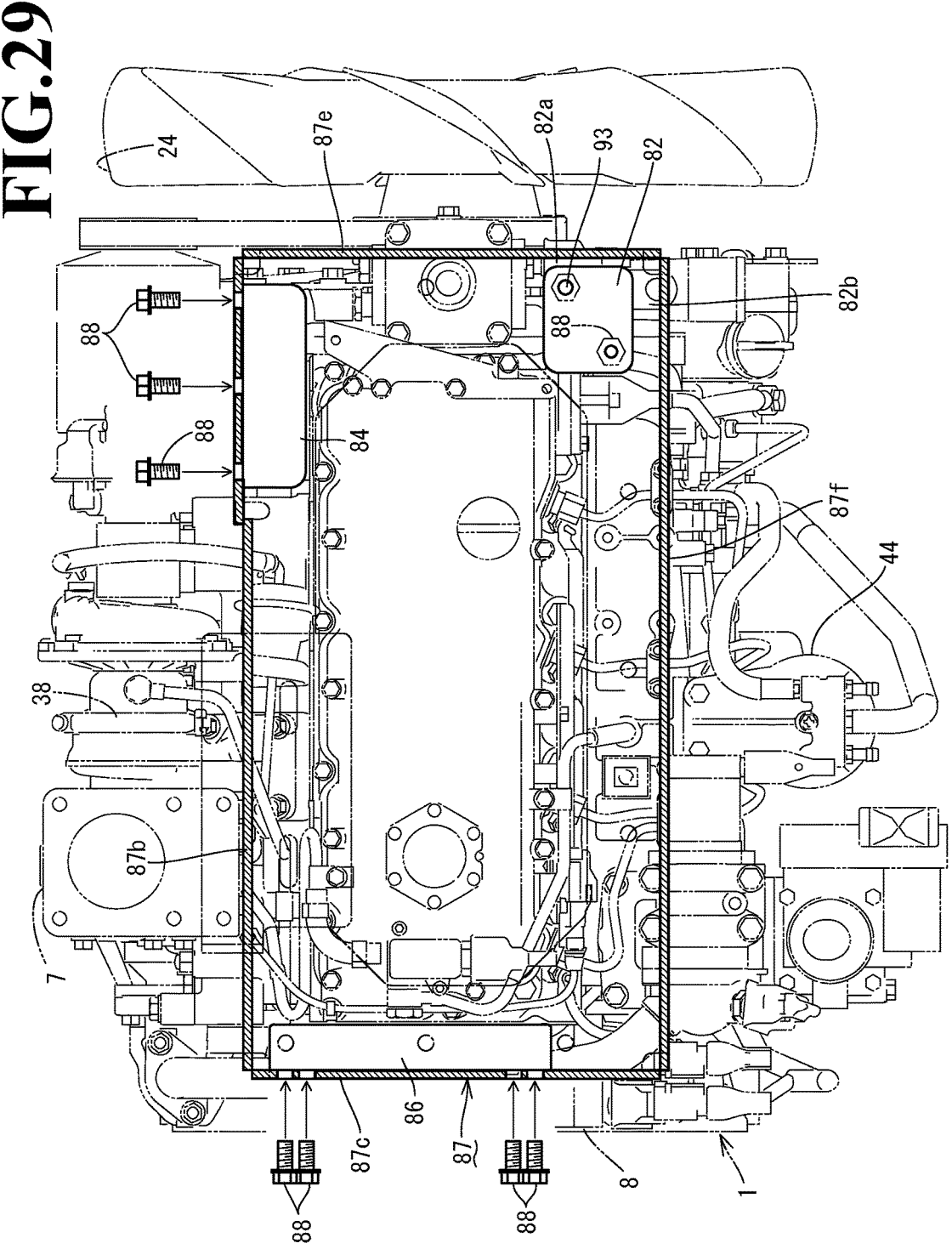
FIG. 29 is a plan cross sectional view of the same.
Figure 30:
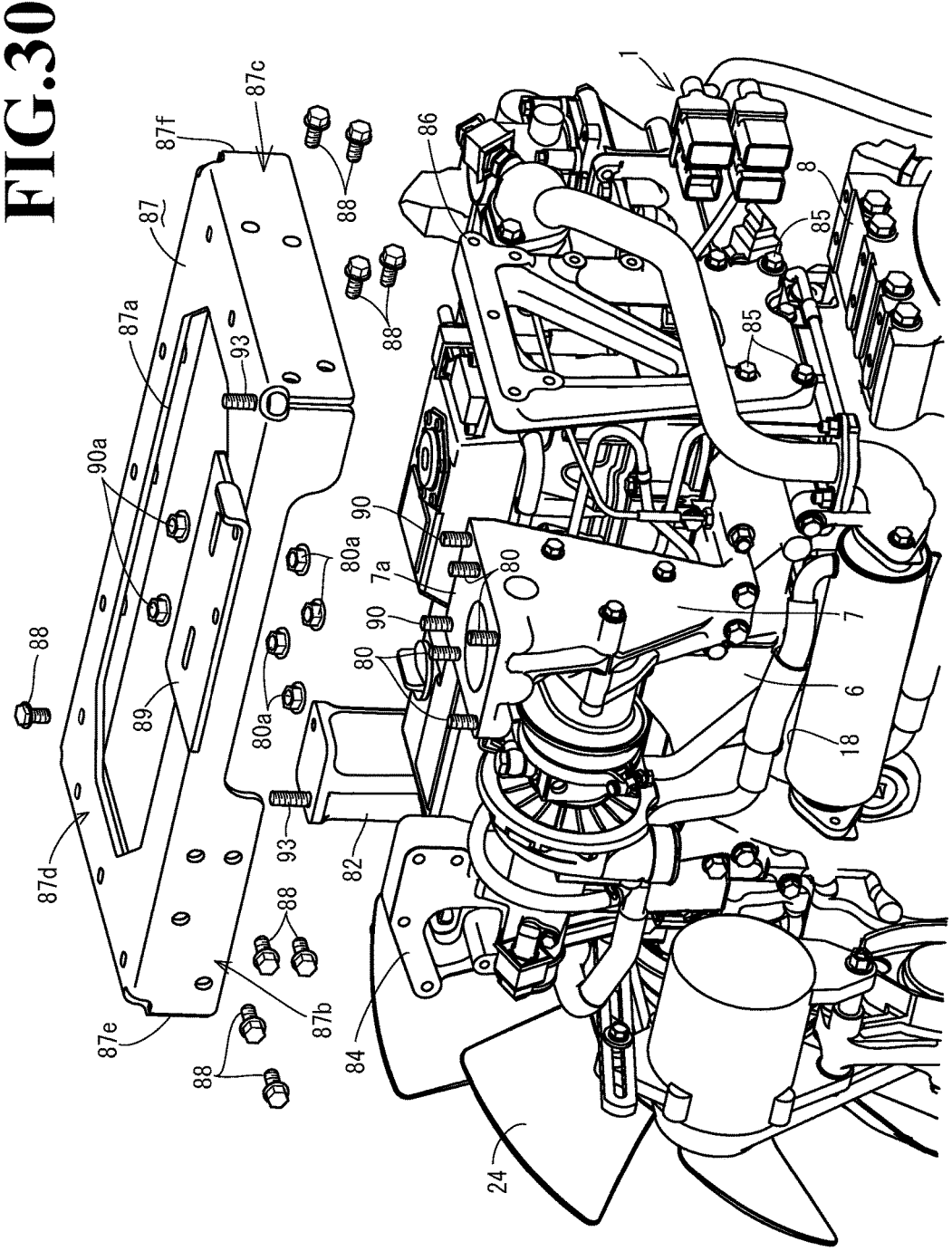
FIG. 30 is a left side perspective view of an upper portion of a diesel engine as seen from a back elevational side.

Further, as shown in FIGS. 15 and 28, a part (a positioning body 89) of the support base 87 is extended to the exhaust gas outlet surface 7a in the upper surface side of the exhaust gas outlet pipe 7 of the diesel engine 1, and the exhaust gas inlet pipe (the DPF inlet pipe 34) of the first case 28 which is open downward comes into contact with the exhaust gas outlet surface 7a in the upper surface side of the exhaust gas outlet pipe 7 from the above. On the other hand, the lower surface side of the positioning body 89 (a part of the support base 87) is brought into contact with the exhaust gas outlet surface 7a in the upper surface side of the exhaust gas outlet pipe 7 from the above, and the support base 87 is fastened to the exhaust gas outlet pipe 7 by positioning bolts 90 which are embedded in the exhaust gas outlet surface 7a and nuts.

As shown in FIGS. 11, 12, 15 to 17, 28, and 29, in the engine device having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the exhaust gas purification device 27 serving as the exhaust gas purification unit is formed by firmly and integrally fixing the first case 28 and the second case 29 by the support frame body 98, and the exhaust gas outlet pipe 7 is used as the support member for the exhaust gas purification device 27 by connecting the DPF inlet pipe 34 serving as the exhaust gas inlet pipe of the first case 28 to the exhaust gas outlet pipe 7 of the diesel engine 1. As a result, the exhaust gas purification device 27 can be supported by the exhaust gas outlet pipe 34 having a high rigidity with the structure for attaching the exhaust gas purification device to the outer peripheral side of the diesel engine 1, it is possible to easily secure a support strength of the exhaust gas purification device 27, and the exhaust gas purification device 27 can be easily attached to and detached from the diesel engine 1 in the maintenance work or the repair work of the diesel engine 1.

As shown in FIGS. 11, 12, 28, and 29, the respective support leg bodies 82, 84, and 86 in the front portion, the side portion, and the rear portion are connected their upper end sides to the lower surface side of the support base 87 having the rectangular shape in the plan view, the support base 87 is arranged in the upper surface side of the diesel engine 1 via the support leg bodies 82, 84, and 86, and the support frame body 98 is firmly and detachably fixed to the approximately horizontal upper surface side of the support base 87. As a result, the exhaust gas purification device 27 can be supported by the support leg bodies 82, 84, and 86, and the exhaust gas outlet pipe 7, and it is possible to easily simplify the support structure for the support leg bodies 82, 84, and 86 while it is possible to easily secure a support strength of the exhaust gas purification device 27. Further, since the support base 87 can be arranged at a position which is away from the outer peripheral surface of the diesel engine 1 via the support leg bodies 82, 84, and 86, it is possible to reduce the interference with the attached part of the diesel engine 1, and it is possible to improve the maintenance workability of the diesel engine 1 as well as the assembly workability of the diesel engine 1.

As shown in FIGS. 11, 12, 28, and 29, the support leg bodies 82, 84, and 86 are respectively connected their lower end sides to three directions including the left side surface and the right side surface of the front portion of the cylinder head 2 having the rectangular shape in the plan view of the diesel engine 1, and the back surface of the rear portion of the cylinder head 2. As a result, the exhaust gas purification device 27 can be supported while using the outer peripheral portion of the cylinder head 2 as the fixing portion, and the exhaust gas purification device 27 can be assembled in the diesel engine 1 while requiring almost no change of the main body side of the diesel engine 1. Further, the diesel engine 1 can be easily moved to a storage place or an assembly place by suspending the diesel engine 1 with a chain block while using the support leg bodies 82, 84, and 86 as an engine lifting bracket attachment seat, for example, in the assembling plant for the diesel engine 1.

As shown in FIGS. 15 to 17, 28, and 29, the part of the support base is extended to the upper surface side of the exhaust gas outlet pipe 7 of the diesel engine 1 with which the DPF inlet pipe 34 (the exhaust gas inlet pipe) of the first case 28 comes into contact, the part of the support base 87 is brought into contact with the upper surface side of the exhaust gas outlet pipe 7 of the diesel engine 1 from above thereof, and the support base 87 is fastened to the exhaust gas outlet pipe 7. As a result, the upper surface of the exhaust gas outlet pipe 7 can be formed as an attachment standard for both of the exhaust gas purification device 27 and the support base 87. In other words, since it is possible to decide the attachment position (a height or a horizontal degree) of the exhaust gas purification device 27 or the support base 87 by the upper surface of the exhaust gas outlet pipe 7, the exhaust gas purification device 27 can be fastened to the support base 87 after the support base 87 is fastened to the exhaust gas outlet pipe 7 (the diesel engine 1), in the assembling plant for the diesel engine 1. In the case that the exhaust gas purification device 27 is installed in the diesel engine 1, it is possible to easily dissolve a working dimensional error of the exhaust gas purification device 27 or the support base 87, and it is possible to improve the assembly workability of the exhaust gas purification device 27.

Next, as shown in FIGS. 9 to 12, FIGS. 15 to 17, and FIGS. 28 to 30, the respective inner surface of a left side wall 87b and a rear side wall 87c of the support base 87 are brought into contact with and fastened to the left side surface of at least two of the side portion support leg body 84 and the rear side surface of the rear portion support leg body 86, and the upper surface of at least one front portion support leg body 82 is brought into contact with the lower surface of a ceiling wall 87d of the support base 87 and fastened by bolts 88. Further, attachment position adjustment gaps 82a and 82b are formed between the front side surface of the front portion support leg body 82 brought into contact with the lower surface of the ceiling wall 87d of the support base 87 and an inner surface of a front side wall 87e of the support base 87, and between a right side surface of the front portion support leg body 82 and an inner surface of a right side wall 87f, and facing surfaces thereof are adapted to be away from each other.

More specifically, the fastening bolt 88 is threadably attached to the front portion support leg body 82 and the support base 87 from an upper surface direction, the fastening bolt 88 is threadably attached to the side portion support leg body 84 and the support base from a left side surface direction, and the fastening bolt 88 is threadably attached to the rear portion support leg body 86 and the support base 87 from a rear side surface direction. Further, the support base 87 is firmly fixed to the exhaust gas outlet pipe 7 from the upper surface direction via a positioning bolt 90 which is implanted to the upper surface side (the exhaust gas outlet surface 7a) of the exhaust gas outlet pipe 7 in the engine 1 and a positioning nut 90a. In addition, the DPF inlet pipe 34 connected to the exhaust gas outlet pipe 7 is firmly fixed to the exhaust gas outlet pipe 7 from the upper surface direction via the bolt 80 which is implanted to the exhaust gas outlet surface 7a and the nut 80a.

As shown in FIGS. 9 to 12, FIGS. 15 to 17, and FIGS. 28 to 30, in the engine device having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the support base 87 in which the first case 28 and the second case 29 are arranged is provided, the support base 87 is provided in the upper surface side of the diesel engine 1 via a plurality of support leg bodies (the front portion support leg body 82, the side portion support leg body 84, and the rear portion support leg body 86), the side surface of the support base 87 is fastened to the respective side surfaces of the side portion support leg body 84 and the rear portion support leg body 86 in any one of the support leg bodies 82, 84, and 86 by being brought into contact therewith, and the lower surface of the support base 87 is fastened to the upper surface of the front portion support leg body 82 in any other of the support leg bodies 82, 84, and 86 by being brought into contact therewith. As a result, it is possible to easily adjust the attachment position between each of the support leg bodies 82, 84, and 86, and the support base 87, even if a working error is generated in the fixing position of the support base 87 to each of the support leg bodies 82, 84, and 86. It is possible to easily execute a fastening work of the bolt 88 by which each of the support leg bodies 82, 84, and 86, and the support base 87 are connected, without correction of the shape of each of the support leg bodies 82, 84, and 86, or the support base 87, and it is possible to improve the attachment workability between each of the support leg bodies 82, 84, and 86, and the support base 87.

As shown in FIGS. 9 to 12, FIGS. 15 to 17, and FIGS. 28 to 30, the support base in which the first case 28 and the second case 29 are arranged is provided, the support base 87 is provided in the upper surface side of the diesel engine 1 via at least three of the support leg bodies 82, 84, and 86, the inner surfaces of the left side wall 87b and the rear side wall 87c of the support base 87 are fastened to the respective side surfaces of at least two of the side portion support leg body 84 and the rear portion support leg body 86 by being brought into contact therewith, the upper surface of at least one front portion support leg body 82 is fastened to the lower surface of the ceiling wall 87d of the support base 87 by being brought into contact therewith, and the support base 87 is adapted to be spaced between the front side surface and the right side surface of the front portion support leg body 82 which is brought into contact with the lower surface of the ceiling wall 87d of the support base 87 and the front side wall 87e and the right side wall 87f of the support base 87 via the gaps 82a and 82b. As a result, it is possible to easily absorb a fastening error (a working dimensional error) between the respective side surfaces of at least two of the side portion support leg body 84 and the rear portion support leg body 86, and the support base 87, by fastening the upper surface of at least one front portion support leg body 82 and the lower surface of the support base 87. It is possible to save a working labor hour for correcting the working dimensional error of each of the support leg bodies 82, 84, and 86, or the support base 87, and it is possible to simplify the work for fastening each of the support leg bodies 82, 84, and 86, and the support base 87.

As shown in FIGS. 9 to 12 and FIGS. 28 to 30, the fastening bolt 88 is threadably attached to at least one front portion support leg body 82 and the support base 87 from the upper surface direction, and the fastening bolt 88 is threadably attached to at least two of the side portion support leg body 84 and the rear portion support leg body 86, and the support base 87, from the side surface direction. As a result, it is possible to firmly fix the upper surface, any of the right and left side surfaces, and any of the front and rear side surfaces of the support base 87 to at least three of the front portion support leg body 82, the side portion support leg body 84, and the rear portion support leg body 86 via the fastening bolts 88. In other words, since the support leg bodies 82, 84, and 86, and the support base 87 can be fastened from the same number of attaching directions as the number of the support leg bodies 82, 84, and 86, it is possible to easily absorb the working dimensional error of each of the support leg bodies 82, 84, and 86, or the support base 87, and it is possible to easily improve a connection rigidity between each of the support leg bodies 82, 84, and 86, and the support base 87. Further, it is possible to easily cover the rectangular upper surface side of the diesel engine 1 with the support base 87 while the support base 87 can be formed into the rectangular shape on which the first case 28 and the second case 29 are easily mounted. Further, the first case 28 and the second case 29 can be mounted to the upper surface side of the diesel engine 1 by making good use of the support base 87 as the upper surface side cover for the diesel engine 1.

As shown in FIGS. 9, 15, and 28 to 30, the positioning body 89 which is formed as a part of the support base 87 is firmly fixed to the exhaust gas outlet pipe 7 from the upper surface direction via the positioning bolts 90 which are implanted to the upper surface side of the exhaust gas outlet pipe 7 of the diesel engine 1. As a result, it is possible to connect the exhaust gas purification device 27 such as the first case 28 and the second case 29 to the support base 87, on the basis of the exhaust gas outlet pipe 7, it is possible to easily dissolve the assembly dimension error of the exhaust gas purification device 27 such as the first case 28 and the second case 29 by the simple connection position adjustment of the support base 87, and it is possible to improve the assembly workability of the exhaust gas purification device 27 such as the first case 28 and the second case 29.

The embodiments of the present invention relates to an engine device such as a diesel engine which is mounted to a working vehicle as an agricultural machine (a tractor or a combine harvester) or a construction machine (a bulldozer, a hydraulic excavator, or a loader), and more particularly to an engine device having an exhaust gas purification device which removes a particulate matter (soot or particulate) contained in exhaust gas, nitrogen oxides (NOx) contained in the exhaust gas, or the like thereon.

What is claimed is:

1. An engine device comprising:
a first case configured to remove particulate matters in an exhaust gas of an engine; and
a second case configured to remove nitrogen oxides in the exhaust gas of the engine; and
wherein the second case is connected to the first case via a urea mixing pipe, and
wherein the engine device comprises a plurality of support leg bodies which are connected to the engine and to a support base, and the first case and the second case are arranged on the support base, and
wherein the support base is fixed to the engine with a positioning body which is fixed to the support base and which is in surface contact with a flat gas outlet surface of an exhaust gas outlet pipe of the engine, and
wherein the exhaust gas outlet pipe of the engine is connected to an exhaust gas inlet pipe of the first case.

2. The engine device according to claim 1, wherein a support frame body is provided for firmly fixing the first case and the second case, the support base is firmly and approximately horizontally fixed to an upper surface side of the engine via the plurality of support leg bodies, the support frame body is firmly fixed to the upper surface side of the support base, the first case and the second case are arranged on the upper surface side of the support base via the support frame body, and the urea mixing pipe is arranged between the first case and the second case on an upper face side of the first case and an upper face side of the second case.

3. The engine device according to claim 1, wherein a vent hole is formed in the support base and wherein a lower surface side of the first case or the second case faces the vent hole, and an air passage is defined by the engine, the first case, the second case, the plurality of support leg bodies and the vent hole.

4. The engine device according to claim 2, wherein an exhaust gas purification unit is formed by firmly and integrally fixing the first case and the second case via the support frame body, and the exhaust gas purification unit is detachably supported on the support base.

5. The engine device according to claim 1, wherein an exhaust gas purification unit is formed by firmly and integrally fixing the first case and the second case via a support frame body, and the exhaust gas outlet pipe of the engine is used as a support member for the exhaust gas purification unit by connecting the exhaust gas inlet pipe of the first case to the exhaust gas outlet pipe of the engine.

6. The engine device according to claim 5, wherein the plurality of support leg bodies comprise respective first ends, and wherein the first ends are connected to a lower surface side of the support base, and wherein the support base has a rectangular shape in a plan view, wherein the support base is arranged on an upper surface side of the engine via the plurality of support leg bodies, and the support frame body is firmly and detachably fixed to the upper surface side of the support base, wherein the upper surface side of the support base is approximately horizontal.

7. The engine device according to claim 6, further comprising a cylinder head having a first cylinder end and a second cylinder end which are opposite longitudinal ends of the cylinder head, the cylinder head comprising a cylinder first side and a cylinder second side defined between the first cylinder end and the second cylinder end, wherein the plurality of support leg bodies comprise respective support leg second ends, and wherein the support leg second ends are connected to the cylinder head at three locations comprising an outer surface of the first cylinder end, a portion of the cylinder first side proximate the second cylinder end, and a portion of the cylinder second side proximate the second cylinder end, wherein the cylinder head has a rectangular shape in a plan view of the engine.

8. The engine device according to claim 6, wherein a first part of the support base extends to an upper surface side of the exhaust gas outlet pipe of the engine with which the exhaust gas inlet pipe of the first case comes into contact, and wherein the first part of the support base is fastened to the exhaust gas outlet pipe.

9. The engine device according to claim 1, wherein a side surface of the support base is fastened to a side surface of any one of the plurality of support leg bodies by being brought into contact therewith, and a lower surface of the support base is fastened to an upper surface of any other of the plurality of support leg bodies by being brought into contact therewith.

10. The engine device according to claim 1, wherein the plurality of support leg bodies comprises a first support leg body, a second support leg body, and a third support leg body, and wherein the support base is provided on an upper surface side of the engine via at least the first, second, and third support leg bodies, and wherein a side wall inner surface of the support base is fastened to respective side surfaces of at least the first and the second support leg bodies by being brought into contact therewith, an upper surface of at least the third support body is fastened to a top wall lower surface of the support base by being brought into contact therewith, and wherein the third support body is spaced from the side wall inner surface of the support base.

11. The engine device according to claim 10, wherein a fastening bolt is threadably attached to the third support leg body and the support base via the upper surface of the third support leg body, and a respective fastening bolt is threadably attached to respective of the first and second support leg bodies and the support base via the side surfaces of the first and second support leg bodies and the side wall inner surface of the support base.

12. The engine device according to claim 10, wherein the support base is firmly fixed to the exhaust gas outlet pipe via bolts which are connected to an upper surface side of the exhaust gas outlet pipe of the engine.

13. The engine device according to claim 1, wherein the support base comprises an upper surface side and the upper surface side defines a first plane and wherein a second plane which is parallel to the first plane intersects the first case and the second case and wherein the first case and the second case are closer to the engine than the urea mixing pipe.

* * * * *